United States Patent
Tabata et al.

(10) Patent No.: US 8,251,864 B2
(45) Date of Patent: Aug. 28, 2012

(54) CONTROL DEVICE FOR HYBRID VEHICLE DRIVE APPARATUS

(75) Inventors: Atsushi Tabata, Okazaki (JP); Yuji Iwase, Mishima (JP); Tatsuya Imamura, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1087 days.

(21) Appl. No.: 12/155,300

(22) Filed: Jun. 2, 2008

(65) Prior Publication Data

US 2008/0305923 A1    Dec. 11, 2008

(30) Foreign Application Priority Data

Jun. 7, 2007   (JP) .................................. 2007-151497

(51) Int. Cl.
  *B60W 20/00*   (2006.01)
(52) U.S. Cl. ........................................ 477/3; 180/65.285
(58) Field of Classification Search .................. 477/2, 3, 477/7, 97, 98; 180/65.21, 65.24, 65.28, 65.285; 903/905

See application file for complete search history.

(56) References Cited

U.S. PATENT DOCUMENTS

| | | | | |
|---|---|---|---|---|
| 3,719,888 A * | 3/1973 | Sampey | | 324/161 |
| 4,740,898 A * | 4/1988 | McKee et al. | | 701/70 |
| 5,487,005 A * | 1/1996 | Genise | | 701/36 |
| 6,327,900 B1 * | 12/2001 | McDonald et al. | | 73/114.55 |
| 6,396,165 B1 * | 5/2002 | Nagano et al. | | 307/10.6 |
| 6,732,526 B2 * | 5/2004 | Minagawa et al. | | 60/706 |
| 6,832,148 B1 * | 12/2004 | Bennett et al. | | 701/54 |
| 7,000,718 B2 * | 2/2006 | Adachi et al. | | 180/65.235 |
| 7,056,260 B2 * | 6/2006 | Nakamori et al. | | 477/3 |
| 7,110,869 B2 * | 9/2006 | Tao et al. | | 701/34 |

FOREIGN PATENT DOCUMENTS

| | | |
|---|---|---|
| JP | A-2004-100580 | 4/2004 |
| JP | A-2005-264762 | 9/2005 |

OTHER PUBLICATIONS

Aug. 23, 2011 Office Action issued in Japanese Patent Application No. 2007-151497 (with partial translation).

* cited by examiner

*Primary Examiner* — Frank Vanaman
(74) *Attorney, Agent, or Firm* — Oliff & Berridge, PLC

(57) ABSTRACT

A control device for hybrid vehicle drive apparatus which executes an internal-combustion-engine rotation control for rotating an engine output shaft under a circumstance where a consecutive travel distance $L_M$ involved in a motor drive running mode exceeds a given consecutive travel distance determining value L1. The rotation of the engine output shaft results in an effect of accelerating the lubrication of an engine. Once the engine output shaft is rotated, no component parts of the engine actually take the completely same attitudes at time before and after such rotation. This avoids the component parts of the engine from continuously remaining contact with each other in the same attitudes when encountered with running vibrations during the motor drive running mode, minimizing adverse affect on durability of the engine due to the running vibrations occurring in the motor drive running mode.

29 Claims, 8 Drawing Sheets

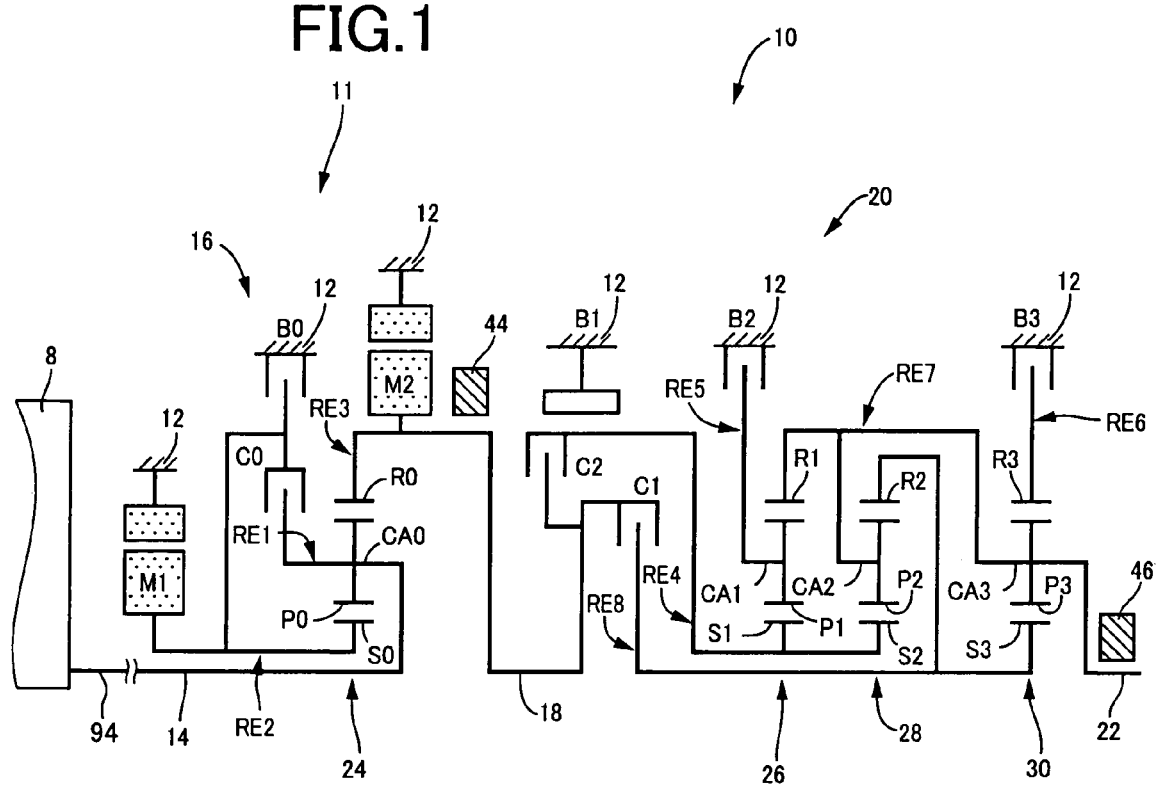

CONTROL DEVICE FOR HYBRID VEHICLE DRIVE APPARATUS

TECHNICAL FIELD

The present invention relates to control devices for hybrid vehicle drive apparatuses enabling an electric motor to run a vehicle with an internal combustion engine remaining in a halted condition. More particularly, it relates to a technology of minimizing an adverse affect on durability of an internal combustion engine caused by running vibrations encountered with the engine during a halt of the engine.

BACKGROUND ART

Conventionally, there has been known a control device for hybrid vehicle drive apparatus including a differential mechanism having a first rotary element connected to an internal combustion engine, a second electric motor connected to a first electric motor, and a third rotary element connected to a second electric motor and a power transmitting path. For instance, Patent Publication 1 (Japanese Patent Application Publication No. 2005-264762) discloses such a control device for hybrid vehicle drive apparatus. The control device for hybrid vehicle drive apparatus was arranged to execute a motor drive running mode to cause a vehicle to run using an output of the second electric motor, with the internal combustion engine remaining in a halted condition.

During the motor drive running mode, the internal combustion engine encountered running vibrations resulting from the running of the vehicle when the internal combustion engine remains in the halted condition. In such a case, more particularly, component parts of the internal combustion engine continuously remained in contact with each other with the same attitudes and no lubricating oil circulated in the internal combustion engine. If such a condition continuously occurred, it was considered that the running vibrations gave adverse affect on durability of the internal combustion engine.

However, despite the control device for hybrid vehicle drive apparatus disclosed in Patent Publication 1 enabling the initiation of the motor drive running mode, no consideration has been taken on the running vibrations possibly causing an adverse affect on the internal combustion engine remaining halted during the motor drive running mode.

SUMMARY OF THE INVENTION

The present invention has been completed with such a view in mind and has an object to provide a control device for a hybrid vehicle drive apparatus, enabling a vehicle to run using an electric motor with an internal combustion engine remaining halted, which minimizes the possibility of adverse affect on durability of the internal combustion engine due to running vibrations acting on the internal combustion engine during a halt of the same.

For achieving the above object, in a first aspect of the invention, (a) the hybrid vehicle drive apparatus comprises an internal combustion engine, and an electric motor connected to a power transmitting path extending to drive wheels, a motor drive running mode being possible to cause a vehicle to run with the electric motor with the internal combustion engine remaining under a halted state; and (b) the control device is operative to perform an internal-combustion-engine rotation control for rotating an output shaft of the internal combustion engine under a circumstance where a consecutive travel distance involved in the motor drive running mode exceeds a given value.

In a second aspect of the invention (a) the hybrid vehicle drive apparatus comprises an internal combustion engine, and an electric motor connected to a power transmitting path extending to drive wheels, a motor drive running mode being possible to cause a vehicle to run with the electric motor with the internal combustion engine remaining under a halted state; and (b) the control device is operative to perform an internal-combustion-engine rotation control for rotating an output shaft of the internal combustion engine under a circumstance where a consecutive travel time involved in the motor drive running mode exceeds a given value.

In a third aspect of the invention, (a) the hybrid vehicle drive apparatus comprises an internal combustion engine, and an electric motor connected to a power transmitting path extending to drive wheels, a motor drive running mode being possible to cause a vehicle to run with the electric motor with the internal combustion engine remaining under a halted state; and (b) the control device is operative to perform an internal-combustion-engine rotation control for rotating an output shaft of the internal combustion engine under a circumstance where a vehicle speed involved in the motor drive running mode exceeds a given value.

In a fourth aspect of the invention, a rotation speed of the output shaft is altered in the internal-combustion-engine rotation control depending on a temperature of a coolant liquid of the internal combustion engine.

In a fifth aspect of the invention, a rotation speed of the output shaft is altered in the internal-combustion-engine rotation control depending on an ambient temperature.

In a sixth aspect of the invention, an implementation time for rotating the output shaft is altered in the internal combustion engine depending on a temperature of a coolant liquid of the internal combustion engine.

In a seventh aspect of the invention, an implementation time for rotating the output shaft is altered in the internal-combustion-engine rotation control depending on an ambient temperature.

In a eighth aspect of the invention, (a) the hybrid vehicle drive apparatus further comprises a power transmitting device connected to the internal combustion engine for power transmissive state; and (b) the power transmitting device comprises an electrically controlled differential portion, including a differential mechanism and a differential-action electric motor connected to the differential mechanism for power transmissive state, which is operative to control a differential state of the differential mechanism upon controlling an operating state of the differential-action electric motor, and a shifting portion forming part of the power transmitting path.

In a ninth aspect of the invention, the shifting portion is a step-variable transmission.

In a tenth aspect of the invention, the electrically controlled differential portion is more than two electric motors and a planetary gear set.

According to a first aspect of the present invention, if the consecutive travel distance involved in the motor drive running mode exceeds the given value, then, the internal-combustion-engine rotation control is executed to rotate the output shaft of the internal combustion engine. This allows the rotation of the output shaft for accelerating the lubrication of the internal combustion engine. This also avoids the component parts of the internal combustion engine from continuously remaining in contact with each other with the same attitudes during a halt of the internal combustion engine, thereby minimizing adverse affect on durability of the internal combustion engine due to the running vibrations caused during the motor drive running mode.

Preferably, during the internal-combustion-engine rotation control, no output shaft of the internal combustion engine is caused to rotate for startup thereof. Thus, no ignition is initiated in the internal combustion engine.

Preferably, the rotation of the output shaft of the internal combustion engine is initiated in the internal-combustion-engine rotation control for a given time interval or a given number of rotations.

A resonating region is often present in a rotation speed range of the internal combustion engine wherein oscillations of the internal combustion engine caused by the rotation thereof are remarkably amplified in a specified rotation speed range of the internal combustion engine. In such a case, preferably, the internal-combustion-engine rotation control allows the rotation speed of the output shaft of the internal combustion engine to be less than the resonating region.

According to another aspect of the present invention, if the consecutive travel time involved in the motor drive running mode exceeds the given value, then, the internal-combustion-engine rotation control is executed. This allows the rotation of the output shaft to accelerate the lubrication of the internal combustion engine. Further, this also avoids the component parts of the internal combustion engine from continuously remaining in contact with each other with the same attitudes during a halt of the internal combustion engine. Thus, adverse affect on durability of the internal combustion engine due to the running vibrations caused during the motor drive running mode is minimized.

In general, as the vehicle speed increases, the oscillations encountered with the internal combustion engine, forming a vehicle, increase in magnitude. In this respect, with a third aspect of the invention, the internal-combustion-engine rotation control is executed when the vehicle speed involved in the motor drive running mode exceeds the given value. This allows the rotation of the output shaft to accelerate the lubrication of the internal combustion engine. Further, this also avoids the internal combustion engine from continuously remaining in a stationary condition during a phase encountered with increased running vibrations, thereby minimizing adverse affect on durability of the internal combustion engine due to the running vibrations caused during the motor drive running mode.

In general, as the temperature of coolant liquid of the internal combustion engine varies, variations occur in the temperature and viscosity of lubricating oil in the internal combustion engine. Thus, even if the internal combustion engine is caused to operate at a given rotation speed for a given time interval, a difference occurs in effects of accelerating the lubrication of the internal combustion engine.

With a fourth aspect of the invention, in this respect, the internal-combustion-engine rotation control is executed to vary the rotation speed of the output shaft depending on the temperature of coolant liquid of the internal combustion engine. Thus, the internal-combustion-engine rotation control can suppress the occurrence of an increase in differences in effect of accelerating the lubrication of the internal combustion engine. Preferably, the rotation speed of the output shaft is altered in the internal-combustion-engine rotation control such that the lower the temperature of coolant liquid of the internal combustion engine, the greater will be the rotation speed of the output shaft.

In general, as the ambient temperature varies, variations occur in the temperature and viscosity of lubricating oil in the internal combustion engine. Thus, even if the internal combustion engine is caused to operate at the given rotation speed for the given time interval, the difference occurs in effects of accelerating the lubrication of the internal combustion engine. With a fifth aspect of the invention, in this respect, the internal-combustion-engine rotation control alters the rotation speed of the output shaft depending on the ambient temperature. Thus, the internal-combustion-engine rotation control can suppress the occurrence of an increase in differences in effect of accelerating the lubrication of the internal combustion engine due to the difference in ambient temperature. Preferably, the rotation speed of the output shaft is altered in the internal-combustion-engine rotation control such that the lower the ambient temperature, the greater will be the rotation speed of the output shaft.

With a sixth aspect of the invention, the implementation time for rotating the output shaft is altered in the internal-combustion-engine rotation control depending on the temperature of coolant liquid in the internal combustion engine. This can suppress the occurrence of an increase in difference in effect of accelerating the lubrication of the internal combustion engine due to the difference in temperature of coolant liquid. Preferably, the implementation time for rotating the output shaft is altered in the internal-combustion-engine rotation control such that the lower the temperature of coolant liquid in the internal combustion engine, the longer will be the implementation time.

With a seventh aspect of the invention, the implementation time for rotating the output shaft is altered in the internal-combustion-engine rotation control depending on the ambient temperature. This can suppress the occurrence of an increase in difference in effect of accelerating the lubrication of the internal combustion engine due to the difference in ambient temperature. Preferably, the implementation time for rotating the output shaft is altered in the internal-combustion-engine rotation control such that the lower the ambient temperature, the longer will be the implementation time.

With a eighth aspect of the invention, the power transmitting device comprises the electrically controlled differential portion, including the differential mechanism and the differential-action electric motor connected to the differential mechanism for power transmitting capability, which is operative to control the differential state of the differential mechanism upon controlling the operating state of the differential-action electric motor, and the shifting portion forming part of the power transmitting path. Thus, the electrically controlled differential portion and the shifting portion enable the continuously variable transmission to be formed as a whole. In addition, the electrically controlled differential portion can not only operate so as to continuously vary the shifting ratio i.e. shifting ratio but also can vary shifting ratio step-by-step.

Preferably, the hybrid vehicle drive apparatus comprises the differential-action limiting device, operable to limit the differential action of the differential mechanism, which causes the output shaft of the internal combustion engine to rotate upon limiting the differential action of the differential mechanism. With such an operation, the output shaft of the internal combustion engine can be rotated without driving the differential-action electric motor for controlling the differential state of the differential mechanism.

With a ninth aspect of the invention, the shifting portion comprises the step-variable transmission, enabling the shifting portion to provide the shifting ratio variable in a wide range.

With a tenth aspect of the invention, the electrically controlled differential portion comprises more than two electric motors and a planetary gear set. With such a structure, controlling the operating state of the electric motors enables the electrically controlled differential portion to continuously increase or decrease an output rotation speed.

BRIEF DESCRIPTION OF THE DRAWINGS

FIG. 1 is a skeleton view explaining a structure of a hybrid vehicle drive apparatus to which a control device of the present invention is applied.

FIG. 2 is an engagement operation table illustrating the relationship between a shifting operation, in which the hybrid vehicle drive apparatus, shown in FIG. 1, is placed in an continuously variable or step-variable shifting state, and the operations of hydraulic-type frictional engaging devices in combination.

BEST MODE FOR CARRYING OUT THE INVENTION

Figure 3:
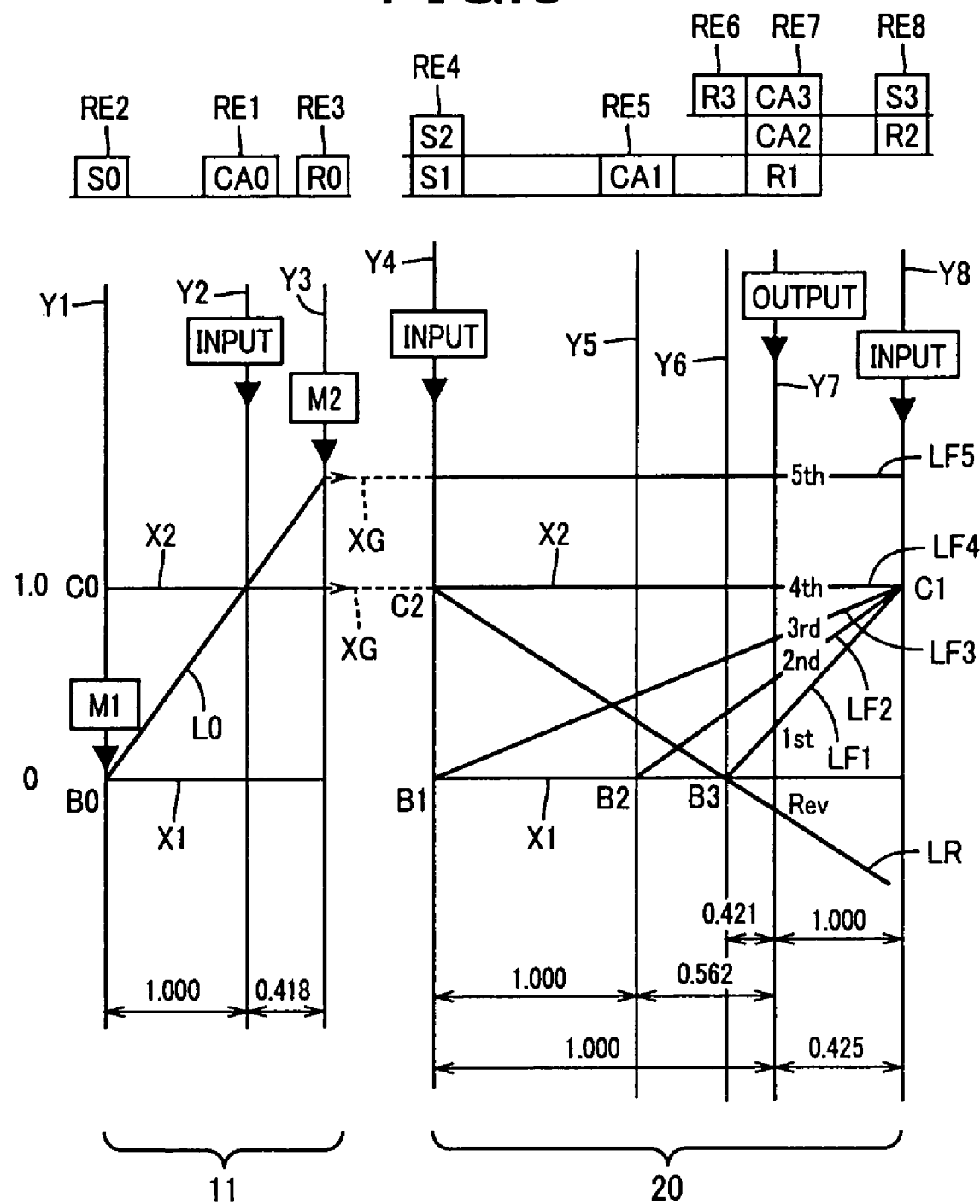
FIG. 3 is a collinear chart illustrating the relative rotation speeds of rotary elements in different gear positions when the hybrid vehicle drive apparatus, shown in FIG. 1, is caused to operate in the step-variable shifting state.

Now, various embodiments of the present invention will be described below in detail with reference to accompanying drawings.

Embodiment

A hybrid vehicle drive system, to which a control device of the present invention is applied, includes a shifting mechanism 10, acting as a power transmitting device, and an engine 8. FIG. 1 is a skeleton view illustrating the shifting mechanism 10 forming part of the hybrid vehicle drive system. In FIG. 1, the shifting mechanism 10 includes an input shaft 14 disposed as an input rotary member in a transmission casing 12 (hereinafter referred to as a "casing 12") in line with a common axis which is mounted on a vehicle body as a non-rotary member, a differential portion 11 directly connected to the input shaft 14 or indirectly connected thereto through a pulsation absorbing damper (vibration damping device) not shown, an automatic shifting portion 20 connected to a power transmitting path between the differential mechanism 11 and drive wheels 38 (see FIG. 6) via a power transmitting member (transmission shaft) 18 in series, and an output rotary member 22 connected to the automatic shifting portion 20, all of which are connected in series.

Figure 6:
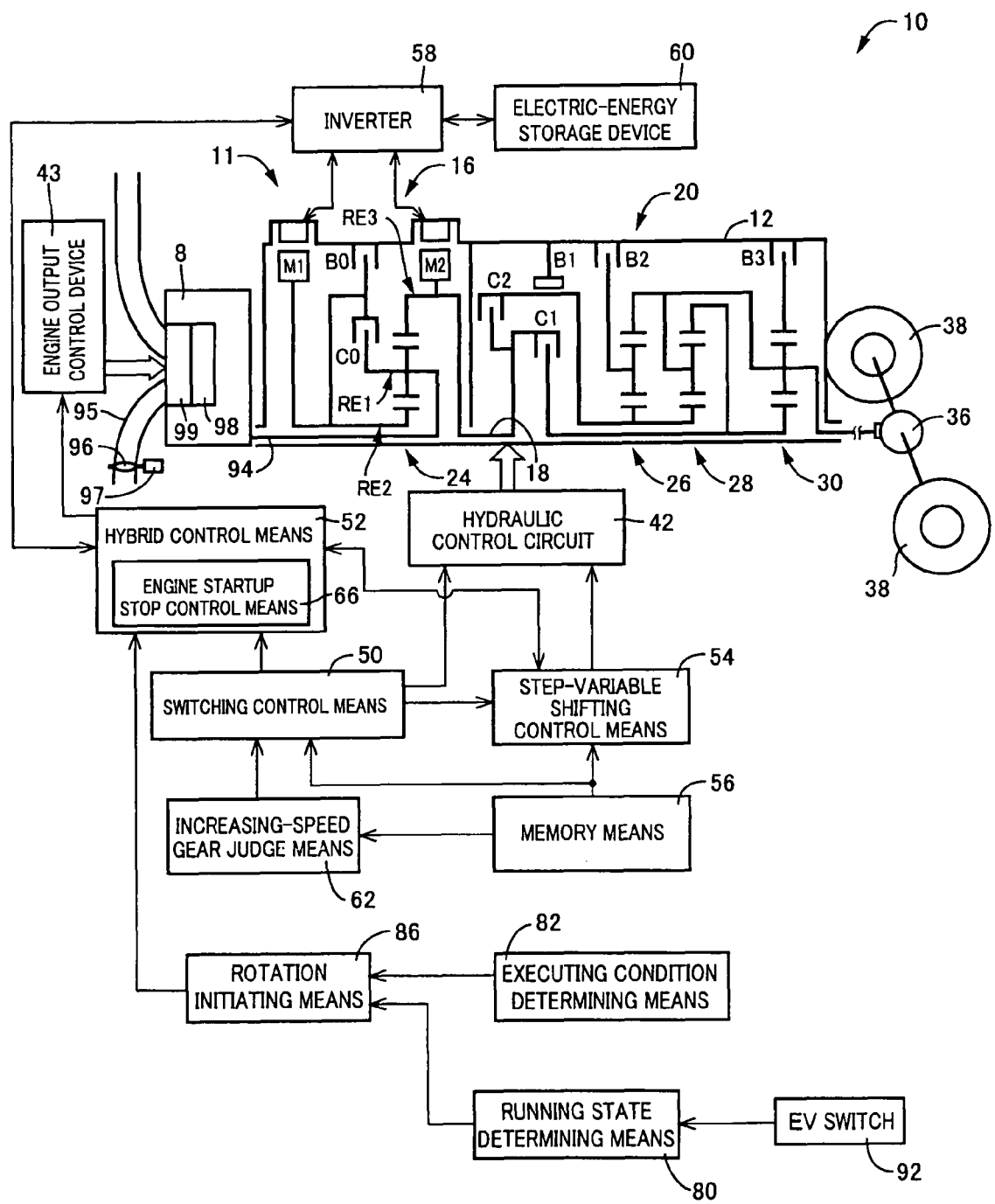
FIG. 6 is a functional block diagram illustrating a major control function to be executed by the electronic control device shown in FIG. 4.

The shifting mechanism 10, preferably applicable to a vehicle of FR type (front-engine rear-drive type), is disposed between the engine 8, composed of a running drive-force source such as an internal combustion engine like a gasoline engine or a diesel engine and directly connected to the input shaft 14 or indirectly connected thereto via the pulsation absorbing damper, and a pair of drive wheels 38 (FIG. 6). This allows a drive force, delivered from the engine 8, to be transmitted to the pair of drive wheels 38 on left and right in sequence through a differential gear device 36 (final speed reduction gear) and a pair of drive axles.

With the shifting mechanism 10 of the present embodiment, the engine 8 and the differential portion 11 are directly connected to each other. More particularly, an engine output shaft 94, serving as an output shaft of the engine 8, and the input shaft 14 of the shifting mechanism 10 are directly connected to each other. As used herein, the term "direct connection" refers to a connection, established without intervening any fluid-type transmitting device such as a torque converter, a fluid engaging or the like, which involves a connection established using, for instance, the vibration damping device. The shifting mechanism 10 has upper and lower halves arranged in symmetric relation with respect to an axis of the shifting mechanism 10 and, hence, the lower half is omitted in the skeleton view of FIG. 1.

The differential portion 11 which can be said to be an electrically controlled differential portion in respect of a first electric motor utilized for varying a differential state, is provided with a power distributing mechanism 16 including two electric motors and a differential-portion planetary gear unit 24 corresponding to a claimed planetary gear unit. In particular, the differential portion 11 includes a first electric motor M1 corresponding to a claimed differential-action initiating electric motor, a power distributing mechanism 16, and a second electric motor M2. The power distributing mechanism 16 includes a mechanical mechanism through which an output of the engine 8 inputted to the input shaft 14 is mechanically distributed, which serves as a differential mechanism to distribute the output of the engine 8 to the first electric motor M1 and the power transmitting member 18. The second electric motor M2 is an electric motor connected through the power transmitting path to the drive wheels 38 so as to be unitarily rotatable with the power transmitting member 18.

Further, the first and second electric motors M1 and M2 are so-called motor/generators each of which has a function to perform the operation even as an electric power generator. The first electric motor M1 has at least one function as an electric power generator that generates a reactive force, and the second electric motor M2 has at least one function to serve as an electric motor to act as a running drive-force source for generating a drive force.

The power distributing mechanism 16, corresponding to the claimed differential mechanism, mainly includes a differential-portion planetary gear unit 24 of a single pinion type having a given gear ratio $\rho 0$ in the order of, for instance, about "0.418", a switching clutch C0 and a switching brake B0. The differential-portion planetary gear unit 24 includes rotary elements such as a differential-portion sun gear S0, differential-portion planetary gears P0, a differential-portion carrier CA0 supporting the differential-portion planetary gears P0 such that they are rotatable about their axes and move around the differential-portion sun gear S0, and a differential-portion ring gear R0 held in meshing engagement with the differential-portion sun gear S0 via the differential-portion planetary gears P0. Suppose the differential-portion sun gear S0 and the differential-portion ring gear R0 have the numbers of gear teeth ZS0 and ZR0, respectively, the gear ratio $\rho 0$ is expressed as ZS0/ZR0.

With such a power distributing mechanism 16, the differential-portion carrier CA0 is connected to the input shaft 14, i.e., the engine 8, the differential-portion sun gear S0 is connected to the first electric motor M1, and the differential-portion ring gear R0 is connected to the power transmitting member 18. The switching brake B0 is disposed between the differential-portion sun gear S0 and the casing 12, and the switching clutch C0 is disposed between the differential-portion sun gear S0 and the differential-portion carrier CA0.

As both of the switching clutch C0 and the switching brake B0 are caused to disengage, the power distributing mechanism 16 operates such that the differential-portion sun gear S0, the differential-portion carrier CA0 and the differential-portion ring gear R0, all of which constitute the three elements of the differential-portion planetary gear unit 24, are caused to rotate relative to each other. This allows the power distributing mechanism 16 to be rendered operative to perform a differential action, i.e., in a differential state under which the differential action is effectuated. In this moment, the output of the engine 8 is distributed to the first electric motor M1 and the power transmitting member 18.

A part of the distributed output of the engine 8 causes the first electric motor M1 to generate electric energy, which is stored in a battery, while drivably rotating the second electric motor M2. This renders the differential portion 11 (power distributing mechanism 16) operative to function as an electrically controlled differential device. Thus, the differential portion 11 is placed in a so-called continuously variable shifting state (electrically controlled CVT state), under which the rotation speed of the power transmitting member 18 continuously varies regardless of the engine 8 operating at a given rotation speed.

That is, as the power distributing mechanism 16 is placed in the differential state, the differential portion 11 is also placed in the differential state. In this moment, controlling the operating state of the first electric motor M1 allows the power distributing mechanism 16 to be controlled. Under such a control, the differential portion 11 is placed in the continuously variable shifting state functioning as the electrically controlled continuously variable transmission. This causes a shifting ratio $\gamma 0$ (the rotation speed of the input shaft 14/the rotation speed of the power transmitting member 18) to continuously vary in values ranging from a minimum value $\gamma 0\min$ to a maximum value $\gamma 0\max$.

Under such a state, if the switching clutch C0 or the switching brake B0 is caused to engage, the power distributing mechanism 16 is placed in a non-differential state under which the differential action is disenabled, i.e., no differential action is effectuated. In particular, as the switching clutch C0 is caused to engage causing the differential-portion sun gear S0 and the differential-portion carrier CA0 to be unitarily coupled to each other, the three elements of the differential-portion planetary gear unit 24, including the differential-portion sun gear S0, the differential-portion carrier CA0 and the differential-portion ring gear R0 are caused to rotate together, i.e., in a unitarily rotating state. This causes the power distributing mechanism 16 to be placed in a locked state under the non-differential state in which no differential action is effectuated. Thus, the differential portion 11 is brought into the non-differential state. Further, this results in a status where the rotation speed of the engine 8 matches the rotation speed of the power transmitting member 18. Thus, the differential portion 11 (power distributing mechanism 16) is placed in a fixed shifting state, i.e., a step-variable shifting state to function as a transmission with the shifting ratio $\gamma 0$ being fixed to "1".

Instead of engaging the switching clutch C0, next, if the switching brake B0 is caused to engage, the differential-portion sun gear S0 is coupled to the casing 12. In this case, the power distributing mechanism 16 is placed in the locked state under which the differential-portion sun gear S0 is brought into a non-rotary state under the non-differential state in which no differential action is effectuated. This also causes the differential portion 11 to be placed in the non-differential state. Further, the differential-portion ring gear R0 rotates at a speed higher than that of the differential-portion carrier CA0 and, hence, the power distributing mechanism 16 is caused to function as a speed-increasing mechanism. Thus, the differential portion 11 (power distributing mechanism 16) is placed in the fixed shifting state, that is, the step-variable shifting state to function as a speed-increasing transmission with the shifting ratio $\gamma 0$ fixed to a value smaller than "1", i.e., in the order of, for example, about 0.7.

With the present embodiment, the switching clutch C0 and the switching brake B0 cause the shifting state of differential portion 11 (power distributing mechanism 16) to be selectively placed in the differential state, i.e., the unlocked state, and the non-differential state, i.e., the locked state. That is, the shifting state is switched in one phase to the differential state under which the differential portion 11 (power distributing mechanism 16) is rendered operative as the electrically controlled differential device in a continuously variable shifting state. Under such a shifting state, the differential portion 11 is rendered operative as the continuously variable transmission with, for instance, the shifting ratio being continuously variable.

In the other phase, the shifting state is switched to another shifting state under which no electrically controlled continuously variable shifting operation is effectuated, i.e., the locked state under which the differential portion 11 is rendered inoperative as the continuously variable transmission. This disenables the operation of the continuously variable transmission to cause the shifting ratio to be locked at a fixed value. That is, the differential portion 11 is placed in a fixed shifting state (non-differential state).

Thus, no electrically controlled continuously variable shifting operation is effectuated to render the differential portion 11 inoperative to operate as a transmission of a single-stage or a multi-stage with shifting ratios of one or more than two kinds. In other words, the differential portion 11 is placed in a fixed shifting state to operate as the transmission of the single-stage with a shifting ratio being fixed or the multi-stage. Thus, the switching clutch C0 and the switching brake B0 are caused to function as a differential state switching device to selectively switch the shifting states described above.

The automatic shifting portion 20 corresponding to claimed the shifting portion, is a step variable transmission, operative to vary a shifting ratio (=a ratio of rotation speed $N_{18}$ of power transmitting member 18/rotation speed $N_{OUT}$ of output rotary member 22) step-by-step. The automatic shifting portion 20 serves as the shifting portion that functions as an automatic transmission having a capability of automatically performing the shifting. The automatic shifting portion 20 includes a first planetary gear unit 26 of a single-pinion type, a second planetary gear unit 28 of a single-pinion type and a third planetary gear unit 30 of a single-pinion type. The first planetary gear unit 26 includes a first sun gear S1, first planetary gears P1, a first carrier CA1 supporting the first planetary gears P1 such that they are rotatable about their axes and movable around the first sun gear S1, and a first ring gear R1 held in meshing engagement with the first sun gear S1 via the first planetary gears P1. Thus, the first planetary gear unit 26 has a gear ratio ρ1 of, for instance, about "0.562".

The second planetary gear unit 28 includes a second sun gear S2, second planetary gears P2, a second carrier CA2 supporting the second planetary gears P2 such that they are rotatable about their axes and movable around the second sun gear S2, and a second ring gear R2 held in meshing engagement with the second sun gear S2 via the second planetary gears P2, having a given gear ratio ρ2 of, for instance, about "0.425". The third planetary gear unit 30 includes a third sun gear S3, third planetary gears P3, a third carrier CA4 supporting the third planetary gears P3 such that they are rotatable about their axes and movable around the third sun gear S3, and a third ring gear R3 held in meshing engagement with the third sun gear S3 through the third planetary gears P3, having a given gear ratio ρ3 of, for instance, "0.421".

Suppose the first sun gear S1, the first ring gear R1, the second sun gear S2, the second ring gear R2, the third sun gear S3 and the third ring gear R3 have the numbers of gear teeth represented by ZS1, ZR1, ZS2, ZR2, ZS3 and ZR3, respectively, the gear ratios ρ1, ρ2 and ρ3 are expressed as ZS1/ZR1, ZS2/ZR2, and ZS3/ZR3, respectively.

With the automatic shifting portion 20, the first and second sun gears S and S2 are integrally connected to each other and selectively connectable to the power transmitting member 18 through a second clutch C2 while selectively connectable to the casing 12 through a first brake B1. The first carrier CA1 is selectively connectable to the casing 12 through a second brake B2 and the third ring gear R3 is selectively connectable to the casing 12 through a third brake B3. The first ring gear R1, the second carrier CA2 and the third carrier CA3 are integrally connected to each other and also connected to the output rotary member 22. The second ring gear R2 and the third sun gear S3 are integrally connected to each other and selectively connectable to the power transmitting member 18 through the first clutch C1. Thus, the automatic shifting portion 20 and the power transmitting member 18 are selectively connectable to each other through the first clutch C1 or the second clutch C2 used for the automatic shifting portion 20 to establish a gear shift position.

In other words, the first and second clutches C1 and C2 collectively function as an engaging device for switching the operations of the power transmitting member 18 and the automatic shifting portion 20. That is, such an engaging device selectively switches a power transmitting path between the differential portion 11 (transmitting member 18) and the drive wheels 38 to a power transmitting state, enabling a power transfer through the power transmission path, and a power interrupting mode interrupting the power transfer through the power transmission path. That is, with at least one of the first and second clutches C1 and C2 being engaged, the power transmitting path is placed in the power transmitting state. In contrast, upon disengagements of both the first and second clutches C1 and C2, the power transmitting path is placed in the power interrupting mode.

The switching clutch C0, the first clutch C1, the second clutch C2, the switching brake B0, the first brake B1, the second brake B2 and the third brake B3 are hydraulically operated frictional engaging devices frequently used in a vehicular step-variable type automatic transmission of the related art. One example of the frictional engaging devices includes a wet multi-disc type engaging device having a plurality of superposed friction plates pressed against each other with a hydraulic actuator. Another example includes a band brake type engaging device comprised of a rotary drum having an outer circumferential surface wounded with one band or two bands to be tightened at one ends with a hydraulic actuator to allow associated component parts, between which the rotary drum intervenes, to be selectively connectable to each other.

With the shifting mechanism 10 formed in such a structure, as indicated in an engagement operation table shown FIG. 2, the switching clutch C0, the first clutch C1, the second clutch C2, the switching brake B0, the first brake B1, the second brake B2 and the third brake B3 are selectively engaged in operation. This allows either one of a 1st-speed gear position (1st-speed gear shift position) to a 5th-speed gear position (5th-speed gear shift position) or one of a reverse-drive gear position (reverse-drive gear shift position) and a neural position to be selectively established. Thus, the shifting mechanism 10 can have a shifting ratio γ (=input-shaft rotation speed $N_{IN}$/output-shaft rotation speed $N_{OUT}$) varying in a nearly equal ratio for each gear position.

In particular, with the present embodiment, the power distributing mechanism 16 is comprised of the switching clutch C0 and the switching brake B0, either one of which is caused to engage in operation. This can allow the differential portion 11 to be structured to establish not only a continuously variable shifting state enabling the operation as a continuously variable transmission but also a fixed shifting state enabling the differential portion 11 to act as a transmission with a shifting ratio maintained at a fixed level.

With the shifting mechanism 10, therefore, engaging either one of the switching clutch C0 and the switching brake B0 in operation allows the differential portion 11 placed in the fixed shifting state, and the automatic shifting portion 20 to establish a step-variable shifting state for a step-variable transmission to operate. In contrast, disengaging both of the switching clutch C0 and the switching brake B0 in operation allows the differential portion 11 placed in the continuously variable shifting state, and the automatic shifting portion 20 to establish a continuously variable shifting state for an electrically controlled continuously variable transmission to operate.

In other words, engaging either one of the switching clutch C0 and the switching brake B0 in operation allows the differential portion 11 to be switched to the step-variable shifting state. On the contrary, disengaging both of the switching clutch C0 and the switching brake B0 in operation allows the differential portion 11 to be switched to the continuously variable shifting state. In addition, it can be said that the differential portion 11 is a transmission operative to be switched to one of the step-variable shifting state and the continuously variable shifting state.

For example, under a circumstance where the shifting mechanism 10 functions as the step-variable transmission, the switching clutch C0, the first clutch C1 and the third brake B3 are brought into engagement as represented in FIG. 2. This causes a 1st-speed gear position to be established with a shifting ratio γ1 having a maximum value of, for instance, about "3.357". Engaging the switching clutch C0, the first clutch C1 and the second brake B2 causes a 2nd-speed gear position to be established with a shifting ratio γ2 of, for instance, about "2.180", which is lower than that of the 1st-speed gear position. Engaging the switching clutch C0, the first clutch C1 and the first brake B1 causes a 3rd-speed gear position to be established with a shifting ratio γ3 of, for instance, about "1.424", which is lower than that of the 2nd-speed gear position.

Engaging the switching clutch C0, the first clutch C1 and the second clutch C2 causes a 4th-speed gear position to be established with a shifting ratio γ4 of, for instance, about "1.000", which is lower than that of the 3rd-speed gear position. Engaging the first clutch C1, the second clutch C2 and the switching brake allows a 5th-speed gear position to be established with a shifting ratio γ5 of, for example, about "0.705", which is smaller than that of the 4th-speed gear position. Further, engaging the second clutch C2 and the third brake B3 allows a reverse-drive gear position to be established with a shifting ratio γR of, for example, about "3.209", which lies at a value between those of the 1st- and 2nd-speed gear positions. For a neutral "N" state to be established, for instance, all the clutches and the brakes C0, C1, C2, B0, B1, B2 and B3 are caused to disengage.

However, for the shifting mechanism 10 to function as the continuously variable transmission, both the switching clutch C0 and the switching brake B0 are caused to disengage as indicated in the engagement operation table shown in FIG. 2. With such disengagements, the differential portion 11 is rendered operative to function as the continuously variable transmission and the automatic shifting portion 20 connected thereto in series is rendered operative to function as the step-variable transmission. This causes the rotation speed input to the automatic shifting portion 20, i.e., the rotation speed of the power transmitting member 18 to be infinitely varied for each of the 1st-speed, the 2nd-speed, the 3rd-speed and the 4th-speed gear positions, thereby establishing various gear positions in continuously variable shifting ratios. Accordingly, the shifting ratio is infinitely and continuously variable across the adjacent gear positions, obtaining a continuously variable total shifting ratio (overall shifting ratio) γT as a whole for the shifting mechanism 10.

FIG. 3 is a collinear chart in which the correlation among the rotation speeds of the various rotary elements, coupled in different states for the various gear positions to be established in the shifting mechanism 10, is shown on straight lines. This shifting mechanism 10 includes the differential portion 11 operative to function as a continuously variable shifting portion or a first shifting portion, and the automatic shifting portion 20 operative to function as a step-variable shifting portion or a second shifting portion. The collinear chart of FIG. 3 is plotted on a two-dimensional coordinate system having the horizontal axis, representing the correlation among the gear ratios ρ established with the planetary gear units 24, 26, 28 and 30, and the vertical axis representing relative rotation speeds of the rotary elements. Among three horizontal lines, a horizontal line X1 on a lower side indicates the rotation speed laying at "0" and a horizontal line X2 on an upper side indicates the rotation speed laying at "1.0", i.e., a rotation speed $N_E$ of the engine 8 connected to the input shaft 14. A horizontal line XG indicates the rotation speed of the power transmitting member 18.

Starting from the left in sequence, three vertical lines Y1 to Y3, corresponding to the three elements of the power distributing mechanism 16 forming the differential portion 11, respectively, represent relative rotation speeds of the differential-portion sun gear S0 corresponding to a second rotary element (second element) RE2, the differential-portion carrier CA0 corresponding to a first rotary element (first element) RE1, and the differential-portion ring gear R0 corresponding to a third rotary element (third element) RE3. A distance between adjacent ones of the vertical lines Y1, Y2 and Y3 is determined in accordance with the gear ratio ρ0 of the differential-portion planetary gear unit 24.

Starting from the left in sequence, five vertical lines Y4, Y5, Y6, Y7 and Y8 for the automatic shifting portion 20 represent relative rotation speeds of the first and second sun gears S1 and S2 corresponding to a fourth rotary element (fourth element) RE4 and connected to each other, the first carrier CA1 corresponding to a fifth rotary element (fifth element) RE5, the third ring gear R3 corresponding to a sixth rotary element (sixth element) RE6, the first ring gear R1 and the second and third carriers CA2 and CA3 corresponding to a seventh rotary element (seventh element) RE7 and connected to each other, and the second ring gear R2 and the third sun gear S3 corresponding to an eighth rotary element (eighth element) RE8 and connected to each other, respectively. A distance between the adjacent ones of the vertical lines Y4 to Y8 is determined based on the gear ratios ρ1, ρ2 and ρ3 of the first, second and third planetary gear units 26, 28 and 30.

In the correlation between the vertical lines on the collinear chart, if an interval between the sun gear and the carrier is assigned to be a distance corresponding to "1", then, an interval between the carrier and the ring gear is set to a distance corresponding to the gear ratio ρ of the planetary gear unit. That is, for the differential portion 11, an interval between the vertical lines Y1 and Y2 is set to a distance corresponding to "1" and an interval between the vertical lines Y2 and Y3 is set to a distance corresponding to "ρ0". For each of the first to third planetary gear units 26, 28 and 30 of the automatic shifting portion 20, further, an interval between the sun gear and the carrier is set to a distance corresponding to "1" and an interval between the carrier and the ring gear is set to a distance corresponding to "ρ".

Expressing those distances using the collinear chart shown in FIG. 3, the shifting mechanism 10 of the present embodiment takes the form of a structure including the power distributing mechanism 16 (differential portion 11). With the power distributing mechanism 16, the differential-portion planetary gear unit 24 has the first rotary element RE1 (differential-portion carrier CA0) connected to the input shaft 14, i.e., the engine 8, while selectively connectable to the second rotary element RE2 (differential-portion sun gear S0) through the switching clutch C0. The second rotary element RE2 is connected to the first electric motor M1, while selectively connectable to the casing 12 via the switching brake B0, and the third rotary element RE3 (differential-portion ring gear R0) is connected to the power transmitting member 18 and the second electric motor M2. With such a structure, a diagonal straight line L0, passing across an intersecting point between the lines Y2 and X2, represents the relationship between the rotation speeds of the differential-portion sun gear S0 and the differential-portion ring gear R0.

For example, as the switching clutch C0 and the switching brake B0 are caused to disengage in operation, the shifting mechanism 10 is switched to the continuously variable shifting state (differential state). Under such a state, controlling the rotation speed of the first electric motor M1 causes the differential-portion sun gear S0 to increase or decrease in rotation speed represented by an intersecting point between the straight line L0 and the vertical line Y1. In this case, if the rotation speed of the differential-portion ring gear R0, bound with a vehicle speed V, remains at a nearly fixed level, then, the rotation speed of the differential-portion carrier CA0, represented by an intersecting point between the straight line L0 and the vertical line Y2, increases or decreases.

As the differential-portion sun gear S0 and the differential-portion carrier CA0 are connected to each other upon engagement of the switching clutch C0, the power distributing mechanism 16 is brought into the non-differential state with the three rotary elements being caused to unitarily rotate. Thus, the straight line L0 coincides with the horizontal line X2, causing the power transmitting member 18 to rotate at the same rotation speed as the engine rotation speed $N_E$. In contrast, engaging the switching brake B0 results in a halt of the differential-portion sun gear S0 in rotation. In this case, the differential portion 11 is placed in the non-differential state with the power distributing mechanism 16 functioning as a speed increasing mechanism. Thus, the straight line L0 assumes a status shown in FIG. 3. Under such a status, the rotation of the differential-portion ring gear R0, i.e., the rotation of the power transmitting member 18, represented by an intersecting point between the straight line L0 and the vertical line Y3, is input to the automatic shifting portion 20 at an increasing rotation speed higher than the engine rotation speed $N_E$.

With the automatic shifting portion 20, the fourth rotary element RE4 is selectively connectable to the power transmitting member 18 through the second clutch C2 and selectively connectable to the casing 12 through the first brake B1. The fifth rotary element RE5 is selectively connectable to the casing 12 through the second brake B2 and the sixth rotary element RE6 is selectively connectable to the casing 12 through the third brake B3. The seventh rotary element RE7 is connected to the output rotary member 22 and the eighth rotary element RE8 is selectively connectable to the power transmitting member 18 through the first clutch C1.

With the automatic shifting portion 20, as shown in FIG. 3, the first clutch C1 and the third brake B3 are engaged in operation. In this case, a diagonal straight line LF1 passes across an intersecting point between the vertical line Y8, indicative of the rotation speed of the eighth rotary element RE8, and the horizontal line X2, and an intersecting point between the vertical line Y6, indicative of the rotation speed of the sixth rotary element RE6, and the horizontal line X1. Thus, the rotation speed of the output rotary member 22 for the 1st-speed gear position is represented by an intersecting point between the diagonal straight line LF1 and the vertical line Y7 representing the rotation speed of the seventh rotary element RE7 connected to the output rotary member 22.

Similarly, a diagonal straight line LF2 is determined upon engagements of the first clutch C1 and the second brake B2. Thus, the rotation speed of the output rotary member 22 for the 2nd-speed gear position is represented by an intersecting point between the diagonal straight line LF2 and the vertical line Y7 representing the rotation speed of the seventh rotary element RE7 connected to the output rotary member 22. A diagonal straight line LF3 is determined upon engagements of the first clutch C1 and the first brake B1. Thus, the rotation speed of the output rotary member 22 for the 3rd-speed gear position is represented by an intersecting point between the diagonal straight line LF3 and the vertical line Y7 representing the rotation speed of the seventh rotary element RE7 connected to the output rotary member 22. A diagonal straight line LF4 is determined upon engagements of the first clutch C1 and the second clutch C2. Thus, the rotation speed of the output rotary member 22 for the 4th-speed gear position is represented by an intersecting point between the diagonal straight line LF4 and the vertical line Y7 representing the rotation speed of the seventh rotary element RE7 connected to the output rotary member 22.

As a result of the switching clutch C0 remaining engaged for the 1st-speed to 4th-speed gear positions, the differential portion 11, i.e., the power distributing mechanism 16 allows a drive force to be applied to the eighth rotary element RE8 at the same rotation speed as that of the engine rotation speed $N_E$.

However, in place of the switching clutch C0, if the switching clutch B0 is caused to engage, then, the drive force is applied from the differential portion 11 to the eighth rotary element RE8 at a higher rotation speed than the engine rotation speed $N_E$. In this case, a horizontal straight line LF5 is determined with the first clutch C1, the second clutch C2 and the switching brake B0 being engaged. Thus, the rotation speed of the output rotary member 22 for the 5th-speed gear position is represented by an intersecting point between the horizontal straight line LF5 and the vertical line Y7 representing the rotation speed of the seventh rotary element RE7 connected to the output rotary member 22.

Figure 4:
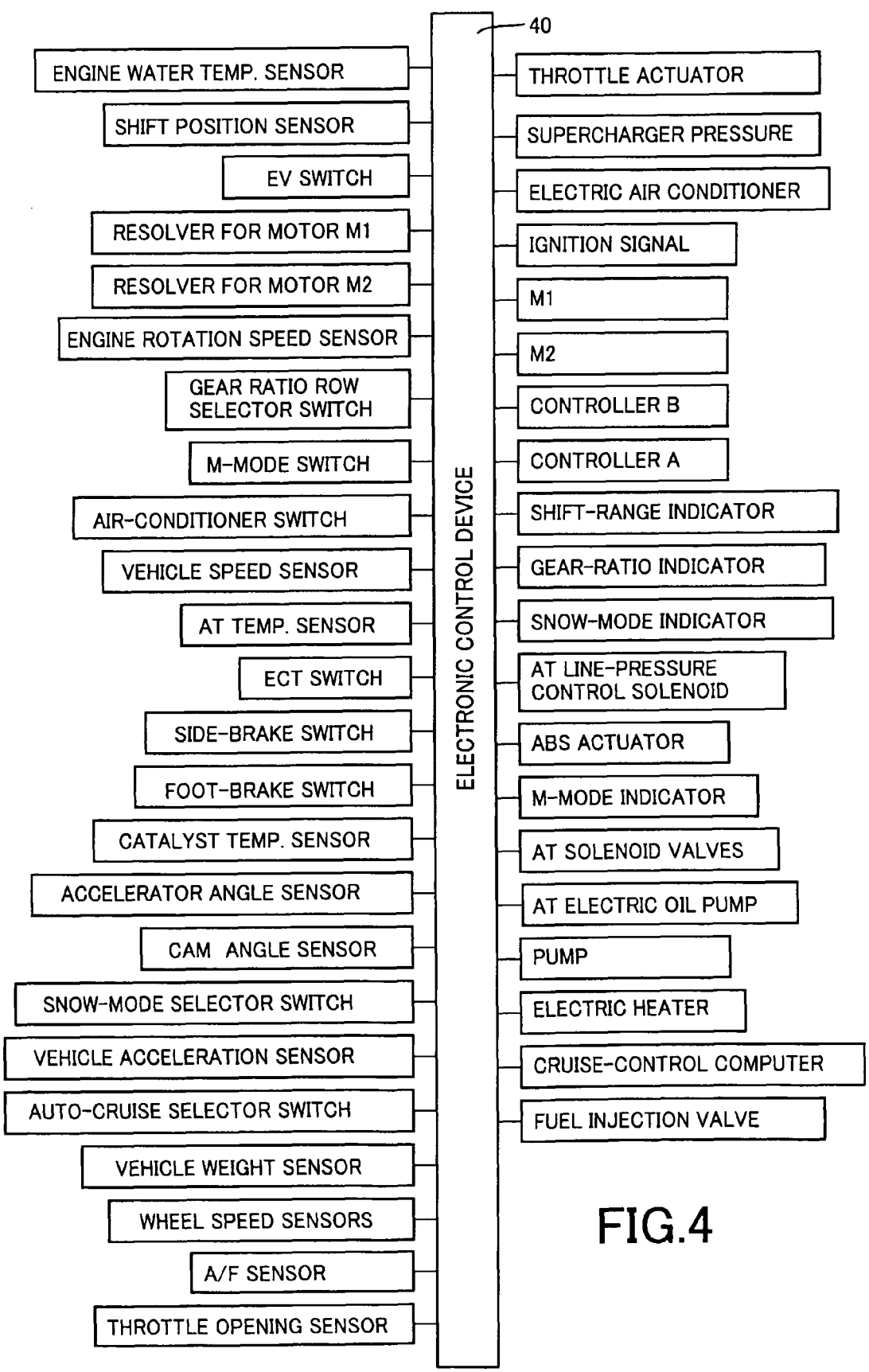
FIG. 4 is a view illustrating input and output signals to be input to or output from an electronic control device incorporated in the hybrid vehicle drive apparatus shown in FIG. 1.

FIG. 4 exemplarily shows various input signals applied to an electronic control device 40, serving as a control device for controlling the shifting mechanism 10 forming part of the vehicular hybrid drive apparatus related to the present invention, and various output signals delivered from the electronic control device 40. The electronic control device 40 includes a so-called microcomputer incorporating a CPU, a ROM, a RAM and input/output interfaces. Upon operation of the microcomputer to perform signal processing according to programs preliminarily stored in the ROM with a temporary data storage function of the RAM in use, hybrid drive controls are executed to control the engine 8 and the first and second electric motors M1 and M2, while executing drive controls such as shifting controls of the automatic shifting portion 20.

The electronic control device 40 is applied with the various input signals from various sensors and switches shown in FIG. 4. These input signals include a signal indicative of an engine cooling water temperature $TEMP_W$; a signal indicative of a selected shift position $P_{SH}$; a signal commanding a motor drive (EV-running) mode; a signal representing a rotation speed $N_{M1}$ (hereinafter, referred to as a "first-motor rotation speed $N_{M1}$") of the first electric motor M1; signals indicative of a rotation speed $N_{M2}$ (hereinafter, referred to as a "second-motor rotation speed $N_{M2}$") of the second electric motor M2 detected with a rotation speed sensor 44 (see FIG. 1) such as a resolver while representing a related rotational direction; a signal indicative of the engine rotation speed $N_E$ representing the rotation speed of the engine 8; a signal indicative of a gear-ratio setting value; a signal commanding an "M" mode (manually shift drive mode); an air-conditioning signal indicative an air conditioner in operation; and a signal representing the vehicle speed V, corresponding to the rotation speed $N_{OUT}$ of the output rotary member 22 detected with a vehicle speed sensor 46 (see FIG. 1), and a traveling direction of a vehicle.

These input signals also include a working oil temperature signal representing working oil temperatures of the automatic shifting portion 20; a signal representing a side brake in operation; a signal representing a foot brake in depressed operation; a catalyst temperature signal indicative of catalyst temperatures; an acceleration-opening signal indicative of a displacement value $A_{CC}$ of an accelerator pedal corresponding to an output demand value required by a driver; a cam angle signal; a snow-mode setting signal indicative of a snow mode being set; an acceleration signal indicative of acceleration in a fore and aft direction of the vehicle; an auto-cruising signal indicative of the vehicle running under an auto-cruising mode; a vehicle weight signal indicative of a weight of the vehicle; a drive-wheel velocity signal indicative of a wheel velocity of each drive wheel; and a signal indicative of an air-fuel ratio A/F of the engine 8. In addition, the rotation speed sensor 44 and the vehicle speed sensor 46 are comprised of sensors operative to detect not only the rotation speeds but also the rotational directions, respectively, and when the automatic shifting portion 20 remains in the neutral position during the traveling of the vehicle, the vehicle speed sensor detects a traveling direction of the vehicle.

The electronic control device 40 outputs various signals such as control signals to be delivered to an engine output control device 43 (see FIG. 6) for controlling the engine output. These control signals include a drive signal to be applied to a throttle actuator 97 for controlling an opening degree $\theta_{TH}$ of an electronic throttle valve 96 incorporated in an intake manifold 95 of the engine 8; a fuel supply quantity signal to be applied to a fuel injection device 98 for controlling the amount to fuel to be supplied to each cylinder of the engine 8; an ignition signal to be applied to an ignition device 99 for commanding an ignition timing of the engine 8; a supercharger-pressure regulating signal for adjusting a supercharged pressure level; an electric air-conditioner drive signal for actuating an electric air conditioner; command signals for commanding the operations of the first and second electric motors M1 and M2; and a shift-position (selected operating position) display signal for activating a shift indicator.

These control signals also includes a gear-ratio display signal for providing a display of a selected gear ratio; a snow-mode display signal for providing a display of a snow mode in operation; an ABS actuation signal for actuating an ABS actuator for preventing the drive wheels from slipping during a braking operation; an M-mode display signal for displaying the M-mode being selected; valve command signals for actuating electromagnet valves incorporated in a hydraulically operated control circuit 42 (see FIG. 6) to control the hydraulic actuators of the hydraulically operated frictional engaging devices of the differential portion 11 and the automatic shifting portion 20; drive command signals for actuating a hydraulic pressure pump serving as a hydraulic pressure source of the hydraulically operated control circuit 42; a signal for driving an electric heater; and signals to be applied to a cruise-control computer, etc.

Figure 5:
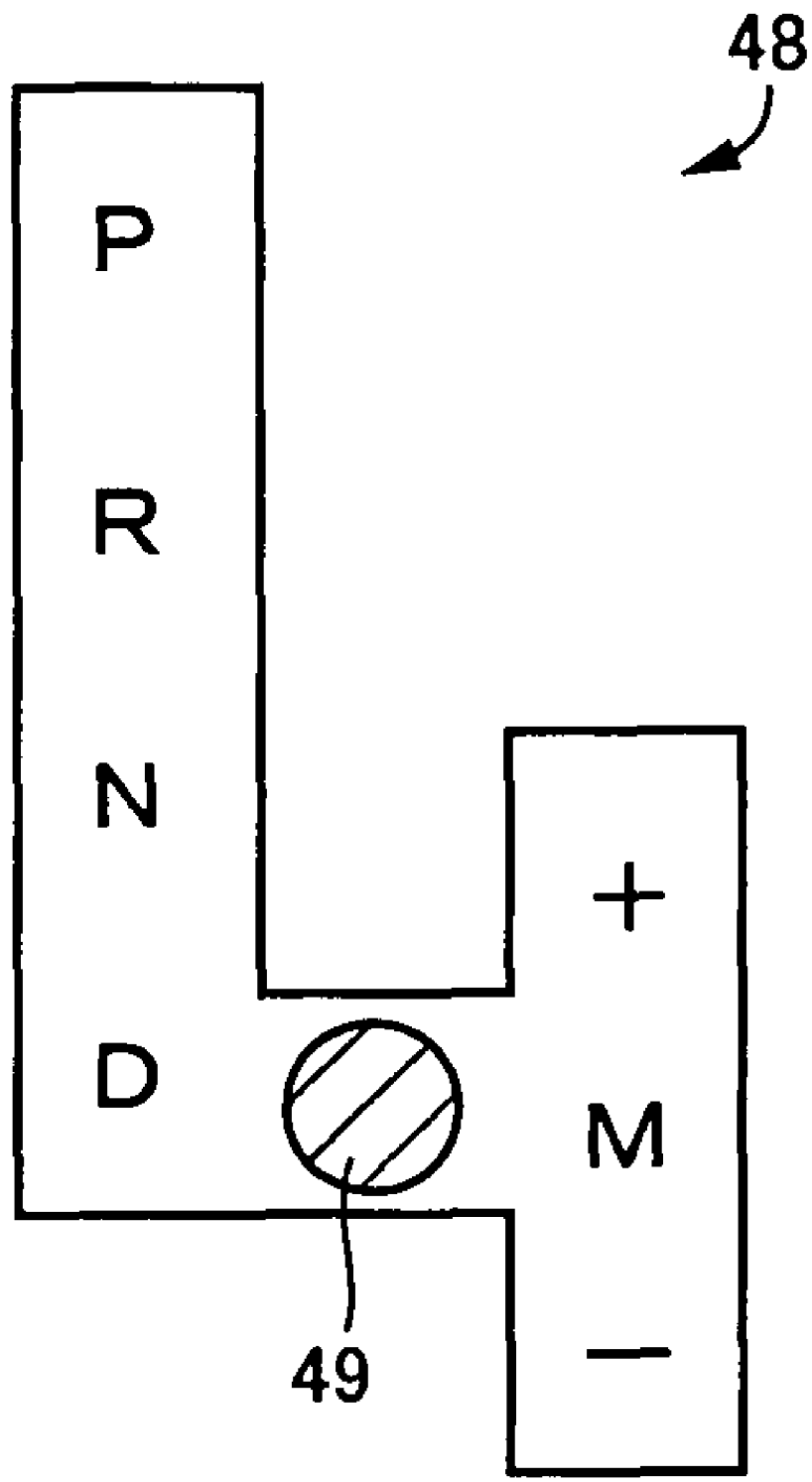
FIG. 5 is a view showing one sample of a shift operating device provided with a shift lever for selecting one of plural kinds of shift positions.

FIG. 5 is a view showing one sample of a shift operating device 48, serving as a switching device, which is manually operated to select one of the shift positions $P_{SH}$ of multiple kinds. The shift operating device 48 includes a shift lever 49 mounted aside, for example, a driver's seat to be manually operated to select one of the shifting positions of the plural kinds.

The shift lever 49 is selectively shifted in manual operation to be set to one of a parking position "P" (Parking), a reverse drive running position "R" (Reverse) for the vehicle to run in a reverse drive mode, a neutral position "N" (Neutral), a forward drive automatic shift position "D" (Drive), or a forward drive manual shift running position "M" (Manual). In the parking position "P", the shifting mechanism 10, i.e., the automatic shifting portion 20 is placed in a neutral state or neutral condition in which the power transmitting path is interrupted, and the output rotary member 22 of the automatic shifting portion 20 is locked. In the neutral position "N", the power transmitting path of the shifting mechanism 10 is interrupted in the neutral state.

In the forward drive automatic shift position "D", an automatic shift control is executed within a varying range of the total shifting ratio $\gamma T$ that can be shifted with the shifting mechanism 10. The forward drive manual shift running position "M", a manual shift running mode (manual mode) is established to set a so-called shift range for specifying a gear shift position in a high speed range during the execution of the automatic shift control.

In conjunction with the manual operation of the shift lever 49 to select each of the shift positions $P_{SH}$, for instance, the hydraulic control circuit 42 is electrically switched. This establishes each of the gear shift positions such as the reverse drive position "R", the neutral position "N" and the forward drive position "D" as indicated in the engagement operation table shown in FIG. 2.

In each of the shift positions $P_{SH}$ among the shift positions "P" to "M" positions, the "P" and "N" positions represent non-running positions selected when no vehicle is caused to run. These represent non-drive positions for selectively switching the power transmitting path in a power interrupting state caused by the first and second clutches C1 and C2 for disenabling the drive of the vehicle. In such a state, the power transmitting path of the automatic shifting portion 20 is placed in the interrupting state under which both the first and second clutches C1 and C2 are caused to disengage as shown in, for example, the engagement operation table of FIG. 2.

The "R", "D" and "M" positions represent running positions selected for the vehicle to run. These shift positions also represent drive positions selected when enabling the drive of the vehicle by selectively switching the power transmitting path in a power transmitting state with the use of the first and second clutches C1 and C2. In such a state, at least one of the first and second clutches C1 and C2 is caused to engage as shown in, for instance, the engagement operation table of FIG. 2.

More particularly, with the shift lever 49 manually operated from the "P" position or the "N" position to the "R" position, the second clutch C2 is caused to engage. Thus, the power transmitting path of the automatic shifting portion 20 is switched from the power interrupting state to the power transmitting state. With the shift lever 49 manually operated from the "N" position to the "D" position, at least the first clutch C1 is caused to engage. Therefore, the power transmitting path of the automatic shifting portion 20 is switched from the power interrupting state to the power transmitting state.

With the shift lever 49 manually operated from the "R" position to the "P" position or the "N" position, the second clutch C2 is caused to disengage, permitting the power transmitting path of the automatic shifting portion 20 to be switched from the power transmitting state to the power interrupting state. With the shift lever 49 manually operated from the "D" position to the "N" position, the first and second clutches C1 and C2 are caused to disengage, thereby permitting the power transmitting path of the automatic shifting portion 20 to be switched from the power transmitting state to the power interrupting state.

Figure 7:
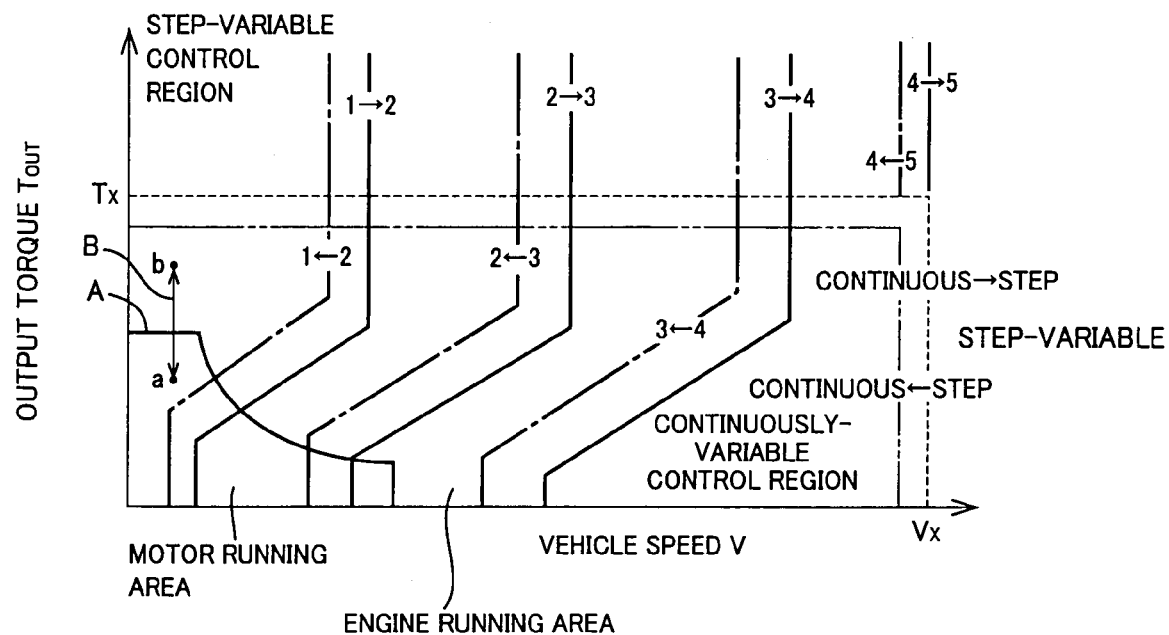
FIG. 7 is a view representing one example of a preliminarily stored shifting diagram, plotted on a two-dimensional coordinate in terms of parameters including a vehicle speed and output torque, based on which shifting in an automatic shifting portion is determined. It also represents one example of a preliminarily stored switching diagram based on which switching of the shifting state of the shifting mechanism is determined, and one example of a preliminarily stored drive-force source switching diagram having a boundary line between an engine drive region and a motor drive region to be used for switching an engine drive mode and a motor drive running mode, while showing the relationship between these examples.

FIG. 6 is a functional block diagram illustrating an essential part of a control function to be performed with the electronic control device 40. In FIG. 6, step-variable shifting control means 54 functions as shifting control means to cause the automatic shifting portion 20 to perform the shifting. For instance, the step-variable shifting control means 54 discriminates whether to cause the automatic shifting portion 20 to execute the shifting. Such discrimination is made based on a vehicle condition represented by the vehicle speed V and the demanded output torque $T_{OUT}$ needed for the automatic shifting portion 20 by referring to the relationship (including the shifting diagram and the shifting map), preliminarily stored in memory means 56, which is plotted in solid lines and single dot lines as shown in FIG. 7. That is, the step-variable shifting control means 54 discriminates a shifting position to be shifted in the automatic shifting portion 20, thereby causing the automatic shifting portion 20 to execute the shifting so as to obtain the discriminated shifting position.

When this takes place, the step-variable shifting control means 54 outputs a command (shifting output command) to the hydraulic control circuit 42 for engaging or disengaging those of the hydraulically operated frictional engaging devices except for the switching clutch C0 and the switching brake B0. Thus, a desired shifting position is established in accordance with, for instance, the engagement operation table shown in FIG. 2.

Hybrid control means 52 renders the engine 8 operative in an operating region at high efficiency under the continuously variable shifting state of the shifting mechanism 10, i.e., under the differential state of the differential portion 11. At the same time, the hybrid control means 52 allows the engine 8 and the second electric motor M2 to deliver drive forces at optimum distributing rates while causing the first electric motor M1 to generate electric power at a varying rate for a reactive force to be generated at an optimum value. This allows the differential portion 11 to operate as the electrically controlled continuously variable transmission to control the shifting ratio $\gamma 0$.

For instance, during the running of the vehicle at a current vehicle speed, the hybrid control means 52 calculates a target (demand) output value of the vehicle by referring to the displacement value Acc of the accelerator pedal and the vehicle speed V representing the output demand value intended by the driver. Then, the hybrid control means 52 calculates a demanded total target output based on the target output value needed for the vehicle and a charge current demand value. To obtain such a total target output, the hybrid control means 52 calculates a target engine output in consideration of a loss in power transfer, loads on auxiliary units and assisted torque obtained from the second electric motor M2, etc. Then, the hybrid control means 52 controls the engine 8 so as to provide the engine rotation speed $N_E$ and engine torque $T_E$ for obtaining the target engine output while controlling a rate of electric power to be generated by the first electric motor M1.

The hybrid control means 52 executes such a control in consideration of the gear position selected for the automatic shifting portion 20 so as to obtain desired power performance and improved fuel consumption. During such a hybrid control, the differential portion 11 is rendered operative to function as the electrically controlled continuously variable transmission. This allows the engine rotation speed $N_E$, determined for the engine 8 to operate in the range at high efficiency, the vehicle speed V to match the rotation speed of the power transmitting member 18 determined based on the gear position selected for the automatic shifting portion 20.

To this end, the hybrid control means 52 preliminarily stores therein an optimum fuel economy curve (including a fuel economy map and relevant relationship) of the engine 8. This is preliminarily determined on an experimental basis so as to have a compromise between driveability and fuel economy performance during the running of the vehicle under a continuously variable shifting mode on a two-dimensional coordinate with parameters including, for instance, the engine rotation speed $N_E$ and output torque (engine torque) $T_E$ of the engine 8. To cause the engine 8 to operate on such an optimum fuel economy curve, a target value on the total shifting ratio $\gamma T$ of the shifting mechanism 10 is determined so as to obtain engine torque $T_E$ and the engine rotation speed $N_E$ for generating the engine output demanded for satisfying, for instance, the target output (total target output and demanded drive force). To obtain such a target value, the shifting ratio $\gamma 0$ of the differential portion 11 is controlled, thereby controlling the total shifting ratio $\gamma T$ within a variable shifting range at a value, for instance, ranging from 13 to 0.5.

When this takes place, the hybrid control means 52 allows electric energy, generated by the first electric motor M1, to be supplied through an inverter 58 to a battery 60 and the second electric motor M2. In this case, a major part of the drive force, delivered from the engine 8, is mechanically transferred to the power transmitting member 18. The rest of the drive force of the engine is delivered to the first electric motor M1 to be consumed for conversion to electric power. This electric energy is supplied through the inverter 58 to the second electric motor M2, which in turn is driven to provide a drive force for delivery to the power transmitting member 18. Equipments involved from generation of the electric energy to consumption thereof with the second electric motor M2, establish an electric path in which the part of drive force delivered from the engine 8 is converted to electric energy which is converted into mechanical energy.

The hybrid control means 52 functionally includes engine output control means for executing an output control of the engine 8 so as to provide the demanded engine output. The engine output control means actuates an electronic throttle valve 96 so as to controllably open or close the throttle actuator 97 for throttle control while outputting commands singly or in combination to the engine output control device 43. The engine output control device 43 causes the fuel injection device 98 to control the fuel injection quantity and fuel injection timing for fuel injection control while permitting the ignition device 99, such as an igniter or the like, to control ignition timing for ignition timing control. This allows the output control of the engine 8 to be executed so as to provide a desired engine output.

For instance, the hybrid control means 52 drives the throttle actuator 97 in response to the acceleration opening signal Acc by fundamentally referring to the preliminarily stored relationship, not shown, so as to execute throttle control such that the greater the accelerator opening Acc, the greater will be the throttle valve opening $\theta_{TH}$.

A solid line A, shown in FIG. 7, represents a boundary line between an engine drive region and a motor drive region for a drive-force source to be selectively switched to one of the engine 8 and an electric motor, that is, for instance, the second electric motor M2 to cause the vehicle to perform a startup/running (hereinafter referred to as "running"). In other words, this allows the switching to be made between a so-called engine drive mode, in which the engine 8 acts as a running drive-force source for the vehicle to startup/run (hereinafter referred to as "run"), and a so-called motor drive running mode in which the second electric motor M2 acts as the running drive-force source for the vehicle to run.

The preliminarily stored relationship, having the boundary line (on the solid line A) shown in FIG. 7 for an engine drive mode and a motor drive running mode to be switched, represents one example of a drive-force source switching diagram (drive-force source map) formed on a two-dimensional coordinate. The two-dimensional coordinate includes parameters such as the vehicle speed V and output torque $T_{OUT}$ representing a drive-force related value. Memory means 56 preliminarily stores such a drive-force source switching diagram together with the shifting diagram (shifting map) designated by, for instance, the solid line and the single dot line in FIG. 7.

The hybrid control means 52 executes the motor drive running mode or the engine drive mode upon determining which of the motor drive region and the engine drive region is to be selected based on the vehicle condition, represented by the vehicle speed V and demanded torque output $T_{OUT}$, by referring to, for instance, the drive-force source switching diagram shown in FIG. 7. Thus, the hybrid control means 52 executes the motor drive running mode at relatively low output torque $T_{OUT}$, i.e., at low engine torque $T_E$, in which engine efficiency is generally regarded to be lower than that falling in a high torque region, or at a relatively low speed range of the vehicle speed V, i.e., under a low load region as will be apparent from FIG. 7.

During such a motor drive running mode, the hybrid control means 52 executes the operation to suppress a drag of the engine 8 during a halt thereof while enabling fuel consumption to be improved. To this end, the hybrid control means 52 renders the differential portion 11 operative to perform the electrical CVT function (differential action). This causes the first-motor rotation speed $N_{M1}$ to be controlled at a negative rotation speed, i.e., in an idling state such that the differential portion 11 performs the differential action so as to maintain the engine rotation speed $N_E$ at a zero or nearly zeroed level.

With a view to perform the switching between the engine drive mode and the motor drive running mode, the hybrid control means 52 includes engine-startup and stop control means 66 operative to switch the operating condition of the engine 8 to one of an operating state and a stop state. When the hybrid control means 52 executes the operation based on the vehicle condition by referring to, for instance, the drive-force source switching diagram shown in FIG. 7 to determine whether to switch the motor drive running mode and the engine drive mode, the engine-startup and stop control means 66 executes the operation to start up or stop the engine 8.

For instance, if an accelerator pedal is depressed in operation to cause an increase in demanded engine output torque $T_{OUT}$, the vehicle condition varies from the motor drive region to the engine drive region as indicated by a transition "a"→"b" on a solid line B shown in FIG. 7. When this takes place, the hybrid control means 52 switches the motor drive running mode to the engine drive mode. To this end, the engine-startup and stop control means 66 turns on the first electric motor M1 to raise the first-motor rotation speed $N_{M1}$, rendering the first electric motor M1 operative to function as a starter. This allows the ignition device 99 to initiate an ignition at a given engine rotation speed $N_E'$, that is, for instance, at an engine rotation speed $N_E$ enabling the engine 8 to autonomously rotate for startup thereof, thereby increasing the engine rotation speed $N_E$.

During such operation, the engine-startup and stop control means 66 may immediately raise the first-motor rotation speed $N_{M1}$ to rapidly increase the engine rotation speed $N_E$ up to the given engine rotation speed $N_E'$. This can immediately avoid a resonating region in an engine rotation speed region below well-known idling rotation speed $N_{IDLE}$, thereby preventing the engine 8 from vibrating during startup thereof.

If the accelerator pedal is released with a decrease in demanded engine output torque $T_{OUT}$, the vehicle condition varies from the engine drive region to the motor drive region as indicated by another transition "b"→"a" on a solid line B in FIG. 7. When this takes place, the engine-startup and stop control means 66 causes the fuel injection device 98 to interrupt the supply of fuel to the engine 8. That is, a fuel cutoff operation is initiated to stop the engine 8. In such a way, the hybrid control means 52 switches the engine drive mode to the motor drive running mode. During such operation, the engine-startup and stop control means 66 may execute the operation to immediately lower the first-motor rotation speed $N_{M1}$ for immediately lowering the engine rotation speed $N_E$ to the zero or nearly zeroed level. This immediately avoids the engine 8 from encountering the resonating region, thereby precluding the engine 8 from vibrating during startup thereof. In an alternative, the engine-startup and stop control means 66 may execute the operation to stop the engine 8 upon executing an operation to lower the first-motor rotation speed $N_{M1}$ to decrease the engine rotation speed $N_E$ on a stage prior to initiating the fuel cutoff operation to achieve the fuel cutoff operation at the given engine rotation speed $N_E'$.

Even if the engine drive region is present, the hybrid control means 52 may execute the operation to allow electric energy to be supplied to the second electric motor M2 from the first electric motor M1 and/or the battery 60 via the electric path mentioned above. This causes the second electric motor M2 to be driven, thereby performing a torque assisting operation to assist the drive force of the engine 8. Thus, the term "engine drive mode" may also cover the engine drive mode and the motor drive running mode in combination.

Further, the hybrid control means 52 is possible to cause the differential portion 11 to perform the electrical CVT function for sustaining the engine 8 in the operating state regardless of the vehicle left in a halted condition or a low speed condition. During the halt of the vehicle, for instance, a drop occurs in a state of charge SOC of the battery 60 with a need occurring on the first electric motor M1 to generate electric power. In such a case, the engine 8 outputs the drive force to the first electric motor M1 to generate electric power while increasing the rotation speed thereof. Thus, even if the second-motor rotation speed $N_{M2}$, uniquely determined based on the vehicle speed V, is zeroed (nearly zeroed) due to the halted condition of the vehicle, the power distributing mechanism 16 performs the differential action, causing the engine rotation speed $N_E$ to be maintained at a level beyond an autonomous rotation speed.

The hybrid control means 52 executes the operation to cause the differential portion 11 to perform the electrical CVT function for controlling the first-motor rotation speed $N_{M1}$ and/or the second-motor rotation speed $N_{M2}$ such that the engine rotation speed $N_E$ is maintained at an arbitrary rotation speed, regardless of the vehicle remaining under the halted or running state. As will be understood from the collinear chart shown in FIG. 3, for instance, when raising the engine rotation speed $N_E$, the hybrid control means 52 allows the second-motor rotation speed $N_{M2}$, bound with the vehicle speed V, to be maintained at a nearly fixed level while executing the operation to raise the first-motor rotation speed $N_{M1}$.

For determining which of the switching clutch C0 and the switching brake B0 is to be engaged when placing the shifting mechanism 10 in the step-variable shifting state, increasing-speed gear-position determining means 62 executes the operation based on, for instance, the vehicle condition according to the shifting diagram shown in FIG. 7 and preliminarily stored in the memory means 56. This allows the determination to be made whether or not a gear position to be shifted in the shifting mechanism 10 is a gear position on a speed increasing side, i.e., for instance, a 5th-speed gear position.

Switching control means 50 switches the engaging and/ disengaging states of the differential-state switching means (switching clutch C0 and switching brake B0) based on the vehicle condition, thereby selectively executing a switchover between the continuously variable shifting state and the step-variable shifting state, that is, between the differential state and the locked state. For instance, the switching control means 50 executes the operation based on the vehicle condition, represented by the vehicle speed V and demanded output torque $T_{OUT}$, by referring to the relationship (shifting diagram and shifting map) preliminarily stored in the memory means 56 and shown in the broken line and the double dot line in FIG. 7.

Thus, the determination is made on whether to switch the shifting state of the shifting mechanism 10 (differential portion 11). That is, the determination is made on whether the shifting mechanism 10 belongs to a continuously variable shifting control region to be placed in the continuously variable shifting state, or a step-variable shifting control region to be placed in the step-variable shifting state. Thus, based on the discriminated shifting state to be switched in the shifting mechanism 10, the operation is executed to selectively switch the shifting state to one of the continuously variable shifting state and the step-variable shifting state.

More particularly, if the determination is made that the shifting mechanism 10 lies in the step-variable shifting control region, then, the switching control means 50 outputs a signal to the hybrid control means 52. In this case, the hybrid control or the continuously variable shifting control is disenabled or interrupted, while the step-variable shifting control means 54 is caused to accomplish the shifting for the step-variable shifting operation that has been preliminarily determined. When this takes place, the step-variable shifting control means 54 allows the automatic shifting portion 20 to perform the automatic shifting in accordance with, for instance, the shifting diagram preliminarily stored in the memory means 56 and shown in FIG. 7.

For instance, the engagement operation table, shown in FIG. 2 and preliminarily stored in the memory means 56, represents combinations in operations of the hydraulically operated frictional engaging devices, that is, the clutches C0, C1 and C2 and the brakes B0, B1, B2 and B3 to be selected in such a shifting operation. That is, a whole of the shifting mechanism 10, that is, the differential portion 11 and the automatic shifting portion 20, functions as a so-called step-variable automatic transmission, thereby establishing the gear position according to the engagement operation table shown in FIG. 2.

For instance, if the increasing-speed gear-position determining means 62 determines selection of the 5th-gear position, the switching control means 50 executes the operation to obtain a speed-increasing gear position, i.e., a so-called overdrive-gear position with a shifting ratio less than "1.0" for the shifting mechanism 10 as a whole. To this end, the switching control means 50 outputs a command to the hydraulic control circuit 42 for disengaging the switching clutch C0 while engaging the switching brake B0 so as to render the differential portion 11 operative to function as an auxiliary transmission with a fixed shifting ratio γ0, i.e., for instance, the shifting ratio γ0 equal to "0.7".

Further, if the increasing-speed gear-position determining means 62 determines no selection of 5th-gear position, the switching control means 50 executes the operation to obtain a speed-reducing gear position with a shifting ratio of "1.0" or more for the shifting mechanism 10 as a whole. To this end, the switching control means 50 outputs another command to the hydraulic control circuit 42 for engaging the switching clutch C0 while disengaging the switching brake B0 so as to render the differential portion 11 operative to function as the auxiliary transmission with a fixed shifting ratio γ0, i.e., for instance, the shifting ratio 70 of "1".

Thus, the switching control means 50 switches the shifting mechanism 10 in the step-variable shifting state under which gear positions of two kinds are selectively switched to either one gear position. With the differential portion 11 rendered operative to function as the auxiliary power transmission, while the automatic shifting portion 20 connected to the differential portion 11 in series is rendered operative to function as the step-variable transmission, a whole of the shifting mechanism 10 is rendered operative to function as the so-called step-variable automatic transmission.

On the contrary, if the switching control means 50 determines that the shifting mechanism 10 remaining in the continuously variable shifting control region to be switched to the continuously variable shifting state, the whole of the shifting mechanism 10 can obtain the continuously variable shifting state. To this end, the switching control means 50 outputs a command to the hydraulic control circuit 42 for disengaging both the switching clutch C0 and the switching brake B0 so as to place the differential portion 11 in the continuously variable shifting state to enable a continuously variable shifting operation to be executed.

Simultaneously, the switching control means 50 outputs a signal to the hybrid control means 52 for permitting the hybrid control to be executed. In addition, the switching control means 50 outputs a signal to the step-variable shifting control means 54, causing the shifting mechanism 10 to be fixed to the gear position preset for the continuously variable shifting state. Alternatively, another signal is output to the step-variable shifting control means 54 to permit the automatic shifting portion 20 to perform the automatic shifting in conformity to, for instance, the shifting diagram, shown in FIG. 7, which is preliminarily stored in the memory means 56. In such a case, the step-variable shifting control means 54 allows the automatic shifting to be initiated upon executing the operations excepting the operation to engage the switching clutch C0 and the switching brake B0 in the engagement operation table shown in FIG. 2.

Thus, the switching control means 50 switches the differential portion 11 to the continuously variable shifting state to function as the continuously variable transmission, while rendering the automatic shifting portion 20, connected to the differential portion 11 in series, operative to function as the step-variable transmission. This allows the drive force to be obtained at an optimum power rate. Simultaneously, the rotation speed input to the automatic shifting portion 20, i.e., the rotation speed of the power transmitting member 18 is infinitely varied for the gear positions of the 1st-speed, 2nd-speed, 3rd-speed and 4th-speed of the automatic shifting portion 20. This enables the respective gear positions to be obtained in continuously variable shifting ratio ranges. Accordingly, the shifting ratio across the adjacent gear positions becomes continuously variable and the whole of the shifting mechanism 10 can obtain the overall shifting ratio γT in a continuously variable mode.

Now, FIG. 7 will be described more in detail. FIG. 7 is a view showing the relationship (shifting diagram and shifting map), preliminarily stored in the memory means 56, based on which the operation is executed to determine the shifting of the automatic shifting portion 20. FIG. 7 represents one example of the shifting diagram plotted on a two-dimensional coordinate with parameters including the vehicle speed V and demanded output torque $T_{OUT}$ indicative of the drive-force related value. In FIG. 7, the solid lines represent upshift lines and single dot lines represent downshift lines.

In FIG. 7, the broken line represents a determining vehicle speed Vx and a determining output torque Tx for the switching control means 50 to determine the step-variable control region and the continuously variable control region. That is, the broken lines represent a high vehicle-speed determining line and a high-output drive determining line. The high vehicle-speed determining line includes a series of determining vehicle speeds V1 representing a high-speed drive determining value preset for determining whether or not a hybrid vehicle lies in a high speed running state. The high-output drive determining line includes a series of determining output torques Tx representing a high-output drive determining value preset for determining the drive-force related value involved in the drive force of the hybrid vehicle, that is, a high output drive in which the automatic shifting portion 20 provides output torque $T_{OUT}$ at a high output. A hysteresis is provided for determining the step-variable control region and the continuously variable control region as indicated by a double dot line in FIG. 7 in contrast to the broken line.

That is, FIG. 7 represents a switching diagram (switching map and relationship) preliminarily stored for regionally determining on whether the shifting mechanism 10 is to be placed in either the step-variable control region or the continuously variable control region. This determination is made based on parameters including the vehicle speed V and output torque $T_{OUT}$ involving the determining vehicle speed Vx and determining output torque Tx. In addition, the memory means 56 may preliminarily store the switching map, inclusive of such a shifting diagram. Moreover, the switching diagram may be of the type that includes at least one of the determining vehicle speed Vx and determining output torque Tx, or may include a preliminarily stored shifting diagram with a parameter taking any of the vehicle speed V and output torque $T_{OUT}$.

The shifting diagram, the switching diagram or the drive-force source switching diagram or the like may be stored not in the form of the map but in a determining formula for comparing between a current vehicle speed V and the determining vehicle speed Vx, and another determining formula for comparing between output torque $T_{OUT}$ and determining output torque Tx. In this case, the switching control means 50 places the shifting mechanism 10 in the step-variable shifting state when the vehicle condition such as, for instance, an actual vehicle speed exceeds the determining vehicle speed Vx. In addition, the switching control means 50 places the shifting mechanism 10 in the step-variable shifting state when the vehicle condition such as, for instance, output torque $T_{OUT}$ of the automatic shifting portion 20 exceeds determining output torque Tx.

Under a circumstance where the vehicle runs in the continuously variable control region with defective functions being encountered, the switching control means 50 may place the shifting mechanism 10 in the step-variable shifting state with priority for the purpose of ensuring the running of the vehicle. The defective functions occur when a failure or functional decline is encountered in control equipment of an electrical line such as an electric motor or the like used for rendering the differential portion 11 operative as the electrically controlled continuously variable transmission. For instance, the defective functions occur in equipment related to the electrical path involved in an operation of the first electric motor M1 for generation of electric energy, and a conversion execution of such electric energy to mechanical energy. That is, the defective functions include failures caused in the first electric motor M1, the second electric motor M2, the inverter 58, the battery 60 and signal transmission lines for interconnecting these component parts to each other, and functional decline caused by breakdown or low temperatures.

As used herein, the term "drive-force related value" described above refers to a parameter corresponding to the drive force of the vehicle in one-to-one relation. Such a parameter may include not only drive torque or drive force appearing at the drive wheels 38 but also the other factors.

These factors may include for instance output torque $T_{OUT}$ of the automatic shifting portion 20; engine torque $T_E$; an acceleration value of the vehicle; an actual value on engine torque $T_E$ calculated based on, for instance, an accelerator opening or throttle valve opening $\theta_{TH}$ (an intake air quantity, an air/fuel ratio or a fuel injection amount) and the engine rotation speed $N_E$; demanded (target) engine output torque $T_E$ calculated based on a displacement stroke of the accelerator pedal depressed by a driver or the throttle opening or the like; demanded (target) output torque $T_{OUT}$ needed for the automatic shifting portion 20; and an estimated value on a demanded drive force or the like. In addition, the drive torque may be calculated upon taking a differential ratio and a radius of each drive wheel 38 into consideration by referring to output torque $T_{OUT}$ or the like, or may be directly detected using a torque sensor or the like. This is true for each of other torques mentioned above.

If the shifting mechanism 10 is placed in the continuously variable shifting state during the running of the vehicle at a high speed, then, a drop occurs in fuel consumption of the vehicle. To address such a defect, the determining vehicle speed Vx is determined so as to render the shifting mechanism 10 operative in the step-variable shifting state during the running of the vehicle at such a high speed. Further, the first electric motor M1 can be miniaturized by preventing reactive torque of the first electric motor M1 from covering a high output region of the engine during the running of the vehicle at a high output. To this end, determining torque Tx is determined to a value in line with, for instance, the characteristic of the first electric motor M1 that is structured and mounted on the vehicle to generate electric energy at a lowered maximum power rate.

Figure 8:
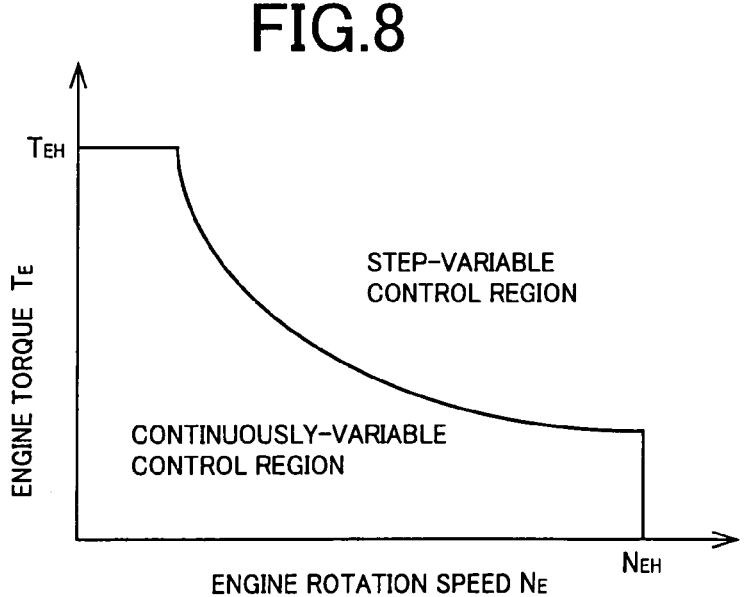
FIG. 8 is a conceptual view showing the preliminarily stored relationship involving a boundary line between a continuously variable control region and a step-variable control region to be suitably used for mapping a boundary between the continuously variable control region and the step-variable control region shown in broken lines in FIG. 7.

FIG. 8 represents a switching diagram (switching map and relationship), preliminarily stored in the memory means 56, which has an engine output line in the form of a boundary line to allow the switching control means 50 to determine a region based on the step-variable control region and the continuously variable control region using parameters including the engine rotation speed $N_E$ and engine torque $T_E$. The switching control means 50 may execute the operation based on the engine rotation speed $N_E$ and engine torque $T_E$ by referring to the switching diagram shown in FIG. 8 in place of the switching diagram shown in FIG. 7. Thus, the switching control means 50 may determine whether the vehicle condition, represented by the engine rotation speed $N_E$ and engine torque $T_E$, lies in the step-variable control region or the continuously variable control region. Further, FIG. 8 is also a conceptual view based on which the broken line in FIG. 7 is to be prepared. In other words, the broken line in FIG. 7 is also a switching line rewritten on a two-dimensional coordinate in terms of the parameters including the vehicle speed V and output torque $T_{OUT}$ based on the relational diagram (map) shown in FIG. 8.

As indicated on the relationship shown in FIG. 7, the step-variable control region is set to lie in a high torque region, where output torque $T_{OUT}$ is greater than the predetermined determining output torque Tx, or a high vehicle speed region where the vehicle speed V is greater than the predetermined determining vehicle speed Vx. Therefore, the step-variable shift drive mode is effectuated at high drive torque, where the engine 8 operates at relatively high torque, or the vehicle speed remaining at a relatively high speed. Further, a continuously variable shift drive mode is effectuated at low drive torque, where the engine 8 operates at relatively low torque, or the vehicle speed remaining at a relatively low speed, i.e., during a phase in which the engine 8 operates at output in common use.

As indicated by the relationship shown in FIG. 8, similarly, the step-variable control region is set to lie in a high-torque region with engine torque $T_E$, exceeding a predetermined given value $T_E$ H, and a high-speed rotating region with the engine rotation speed $N_E$ exceeding a predetermined given value $N_{EH}$, or a high output region with engine output, calculated based on engine torque $T_E$ and the engine rotation speed $N_E$, which is greater than a given value. Therefore, the step-variable shift drive mode is effectuated at relatively high torque, relatively high rotation speed or relatively high output of the engine 8. The continuously variable shift drive mode is effectuated at relatively low torque, relatively low rotation speed or relatively low output of the engine 8, i.e., at commonly use output of the engine 8. The boundary line, shown in FIG. 9, between the step-variable control region and the continuously variable control region corresponds to a high vehicle-speed determining line composed of a series of high vehicle-speed determining values and a high-output drive determining value composed of a series of high-output drive determining values.

With such a boundary line, for instance, during the running of the vehicle at a low/medium speed and low/medium output, the shifting mechanism 10 is placed in the continuously variable shifting state to ensure the vehicle to have improved fuel economy performance. On the contrary, during the running of the vehicle at a high speed with an actual vehicle speed V exceeding the determining vehicle speed Vx, the shifting mechanism 10 is placed in the step-variable shifting state to act as the step-variable transmission. In this moment, the output of the engine 8 is transferred to the drive wheels 38 mainly through a mechanical power transmitting path. This suppresses a loss in conversion between the drive force and electric energy, generated when the shifting mechanism 10 acts as the electrically controlled continuously variable transmission, resulting in improved fuel consumption.

During the running of the vehicle on the high output drive mode with the drive-force related value, such as output torque $T_{OUT}$ or the like, which exceeds determining torque Tx, the shifting mechanism 10 is placed in the step-variable shifting state to act as the step-variable transmission. In this moment, the output of the engine 8 is transferred to the drive wheels 38 mainly through the mechanical power transmitting path. In this case, the region where the shifting mechanism 10 is rendered operative to act as the electrically controlled continuously variable transmission lies in the low/medium speed running region and the low/medium output running region of the vehicle. This enables a reduction in the maximum power rate of electric energy to be generated by the first electric motor M1, i.e., electric energy to be delivered from the first electric motor M1, thereby causing the first electric motor M1 per se or a vehicle drive apparatus including such a component part to be further miniaturized in structure.

According to another viewpoint, further, during the running of the vehicle on such a high output drive mode, the driver has much concern on requirement of the drive force with less concern on a requirement of a mileage. Thus, the shifting mechanism 10 is switched to the step-variable shifting state (fixed shifting state) rather than to the continuously variable shifting state. With such a switching operation, the driver can enjoy a fluctuation in the engine rotation speed $N_E$, i.e., a rhythmical variation in the engine rotation speed $N_E$ caused by the upshifting in the step-variable automatic shift running mode.

In such a way, the differential portion 11 (shifting mechanism 10) of the present embodiment can be selectively switched to one of the continuously variable shifting state and the step-variable shifting state (fixed shifting state). Thus, the operation is executed based on the vehicle condition to determine the shifting state to be switched in the differential portion 11, thereby causing the shifting state to be selectively switched to either one of the continuously variable shifting state and the step-variable shifting state. With the present embodiment, further, the hybrid control means 52 executes the operation based on the vehicle condition to perform the switching between the motor drive running mode and the engine drive mode. With a view to switching the motor drive running mode and the engine drive mode, the engine startup and stop control means 66 operates to start up or stop the engine 8.

During the vehicle running under the motor drive running mode, the engine 8 basically remains in a stationary state. More particularly, component parts of the engine 8 remain halted intact with the same attitudes to be continuously kept in contact with each other under which no lubricating oil is circulated through the engine 8 for an extended period of time. During the motor drive running mode, the engine 8 remaining under such a stationary condition described above, encounters running vibrations caused by the running of the vehicle to adversely affect durability of the engine 8. To address such an issue, a proper control is executed for minimizing such an adverse affect on durability of the engine 8 caused by the running vibrations appearing during the motor drive running mode. Hereunder, such a control operation will be described below in detail.

Turning back to FIG. 6, running state determining means 80 determines whether or not the second electric motor M2 performs the motor drive running mode to cause the vehicle to run under a halt state of the engine 8, that is, whether or not the vehicle is caused to run under the motor drive running mode discussed above. During the running of the vehicle, for instance, even if the vehicle remains under a condition dislocated from the motor drive running region, shown in FIG. 7, to fall in the engine drive running region, a vehicle occupant turns on an EV switch 92 for commanding the execution of the motor drive (EV running) running mode. That is, if the EV switch 92 is operated, then, a signal is output for commanding the motor drive (EV running) mode to be initiated. In such a case, the running state determining means 80 determines that the vehicle is under the motor drive running state. On the contrary, during the engine drive running mode, due to absence of the motor drive running state, the running state determining means 80 determines absence of the motor drive running state.

Executing condition determining means 82 determines whether or not a consecutive travel distance $L_M$ involved in the motor drive running mode exceeds a given consecutive travel distance determining value L1. As used herein, the term "consecutive travel distance $L_M$ involved in the motor drive running mode" refers to a cumulative travel distance involved in the motor drive running mode. Even if the motor drive running mode is intermittently performed, the accumulation of the travel distance continues. However, if the engine drive running mode is initiated to cause an engine output shaft 94, representing an output shaft of the engine 8, to rotate, then, the consecutive travel distance $L_M$ is reset to zero. Thus, the travel distance involved in the motor drive running mode begins to accumulate at time when the motor drive running mode is executed in an initial step on a subsequent stage.

The consecutive travel distance determining value L1 is a threshold value. If the consecutive travel distance $L_M$ involved in the motor drive running mode exceeds the consecutive travel distance determining value L1, then, the determination is made based on it that the engine 8 should not continuously remain under the stationary state on the ground of sustaining durability of the engine 8. Such a threshold value is a given value of for instance 20 km, which is obtained on experimental tests or the like and preliminarily stored in the executing condition determining means 82.

Further, the executing condition determining means 82 determines whether or not a consecutive travel time $T_M$ involved in the motor drive running mode exceeds a given consecutive travel time determining value T1. As used herein, the term "consecutive travel time $T_M$ involved in the motor drive running mode" refers to a cumulative travel time involved in the motor drive running mode. Even if the motor drive running mode is intermittently performed, the accumulation of the travel time continues. However, if the engine drive running mode is initiated to cause the engine output shaft 94, representing an output shaft of the engine 8, to rotate, then, the consecutive travel time $T_M$ is reset to zero. Thus, the travel time involved in the motor drive running mode begins to accumulate at time when the motor drive running mode is executed in an initial step on a subsequent stage.

The consecutive travel time determining value T1 is a threshold value. If the consecutive travel time $T_M$ involved in the motor drive running mode exceeds the consecutive travel time determining value T1, then, the determination is made based on it that the engine 8 should not continuously remain under the stationary state on the ground of sustaining durability of the engine 8. Such a threshold value is a given value of for instance 1.5 hours, which is obtained on experimental tests or the like and preliminarily stored in the executing condition determining means 82.

Further, the executing condition determining means 82 determines whether or not the vehicle speed V1 exceeds the given vehicle speed determining value V1. In general, a tendency occurs in which as the vehicle speed V increases, the running vibrations increase and the running vibrations give increased affect on durability of the engine 8. Thus, the given vehicle speed determining value V1 serves as a threshold value based on which during the motor drive running mode, if the vehicle speed V1 exceeds the given vehicle speed determining value V1, then, the determination is made that the engine 8 should not continuously remain under the stationary state on the ground of sustaining durability of the engine 8. Such a threshold value is a given value of for instance 100 km/h, which is obtained on experimental tests or the like and preliminarily stored in the executing condition determining means 82.

Under a circumstance where the running state determining means 80 determines that the vehicle runs under the motor drive running mode, the executing condition determining means 82 executes one of various determinations. These determinations include a determination that the consecutive travel distance $L_M$ involved in the motor drive running mode exceeds the consecutive travel distance determining value L1; a determination that the consecutive travel time $T_M$ involved in the motor drive running mode exceeds the consecutive travel time determining value T1; and a determination that the vehicle speed V exceeds the given vehicle speed determining value V1. If either one of such determinations is made, rotation initiating means 86 performs an internal-combustion-engine rotation control for rotating the engine output shaft 94 of the engine 8 representing an internal combustion engine.

More particularly, in performing the internal-combustion-engine rotation control, the first-motor rotation speed $N_{M1}$ is raised in the same direction as that in which the second-motor rotation speed $N_{M2}$ is raised. This allows the engine rotation speed $N_E$, representing the rotation speed of the engine output shaft 94, to be raised to a predetermined target rotation speed $N_{E1}$, i.e., for instance, 400 rpm. Thus, the rotation of the engine output shaft 94 is sustained for a predetermined target rotation time $T_{E1}$, i.e., for instance, two seconds with no initiation of engine ignition. The rotation of the engine output shaft 94 causes the consecutive travel distance $L_M$ and the consecutive travel time $T_M$ to be reset to zero.

Furthermore, the predetermined target rotation speed $N_E$, and the predetermined target rotation time $T_{E1}$ represent given values for lubricating the internal part of the engine 8 determined to maintain durability of the engine 8. Thus, it is desired that if such an object can be achieved, the engine output shaft 94 rotate at a low rotation speed for a short period of time on the ground of improving fuel consumption. For the purpose of minimizing the vibrations during the rotation of the engine output shaft 94 to preclude the occurrence of comfort, the predetermined target rotation speed $N_{E1}$ is determined to be less than, for instance, a resonating region in the engine rotation speed region.

There is a tendency in which as the temperature of lubricating oil for lubricating the engine 8 decreases, the relevant viscosity increases and a difficulty is encountered in achieving the lubrication of the engine 8 during the rotation thereof. Thus, the target rotation speed $N_{E1}$, that is, the rotation of the engine output shaft 94 in performing the internal-combustion-engine rotation control, may be determined or altered such that the lower the temperature of the engine 8, that is, the lower the temperature of coolant liquid for cooling the engine 8 or the lower the ambient temperature, the higher will be the target rotation speed $N_{E1}$. In addition, the target rotation time $T_{E1}$, i.e., an implementation time for rotating the engine output shaft 94 in performing the internal-combustion-engine rotation control may be determined or altered such that the lower the temperature of the engine 8 or the lower the ambient temperature, the longer will be the target rotation time $T_{E1}$.

Figure 9:
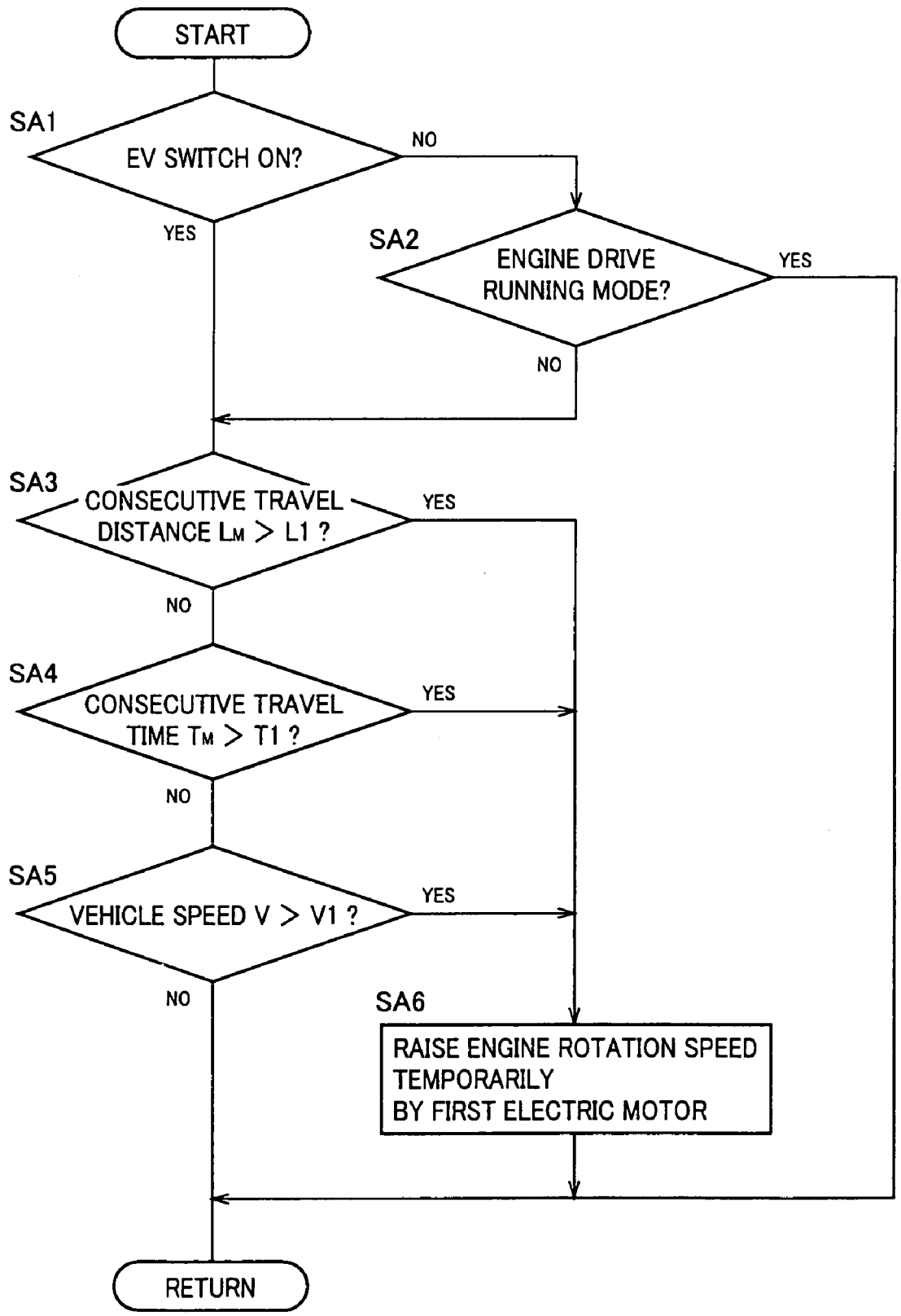
FIG. 9 is a flowchart illustrating a basic sequence of major control operations to be executed with the electronic control device, shown in FIG. 4, that is, a basic sequence of major control operations to be executed for minimizing an adverse affect on durability of an engine due to running vibrations caused in the motor drive running mode.

FIG. 9 is a flowchart for illustrating a major part of control operations to be executed by the electronic control device 40, i.e., the control operations for minimizing an adverse affect on durability of the engine 8 resulting from the running vibrations occurring during the motor drive running mode. Such control operations are repeatedly executed in an extremely short cycle time in the order of, for instance, several milliseconds or several tens milliseconds. Also, the control operations, shown in the flowchart of FIG. 9, are executed during the running of the vehicle.

First, in step (hereinafter the term "step" is omitted) SA1, the operation is executed during the running of the vehicle to determine whether or not the EV switch 92 is turned on. That is, the operation is executed to determine whether or not a signal is output for commanding the execution of the motor drive running mode with the EV switch 92 being turned on. If this determination is made positive, that is, if the EV switch 92 is turned on during the running of the vehicle, then, the motor drive running mode is determined to be present and the sequence proceeds to step SA3. In contrast, if the determination is made negative, then, the sequence goes to SA2.

In SA2, the operation is executed to determine whether or not the engine drive running mode is present. If this determination is made positive, that is, when the engine drive running mode is present, the control operation in FIG. 9 is terminated. On the contrary, if this determination is made negative, then, the motor drive running mode is present and the sequence goes to SA3. Also, SA1 and SA2 collectively correspond to the running state determining means 80.

In SA3, the operation is executed to determine whether or not the consecutive travel distance $L_M$ involved in the motor drive running mode exceeds the given consecutive travel distance determining value L1. The consecutive travel distance $L_M$ is obtained based on, for instance, the rotation speed of the output rotary member 22 of the shifting mechanism 10 detected by a vehicle speed sensor 46. If this determination is made positive, i.e., when the consecutive travel distance $L_M$ involved in the motor drive running mode exceeds the consecutive travel distance determining value L1, the sequence proceeds to SA6. In contrast, if this determination is made negative, the sequence goes to SA4.

Further, the consecutive travel distance $L_M$ involved in the motor drive running mode is a cumulative travel distance, related to the motor drive running mode, which is regarded to be cumulative even if the motor drive running mode is intermittently initiated. If the engine output shaft 94 rotates due to the implementation of the engine drive running mode, then, the consecutive travel distance $L_M$ is reset to zero. The accumulation of the travel distance involved in the motor drive running mode is commenced at a time point when the motor drive running mode is executed in an initial step on a subsequent stage.

In SA4, the operation is executed to determine whether or not the consecutive travel time $T_M$ involved in the motor drive running mode exceeds the given consecutive travel time determining value T1. If this determination is made positive, i.e., when the consecutive travel time $T_M$ involved in the motor drive running mode exceeds the consecutive travel time determining value T1, the operation proceeds to SA6. In contrast, if this determination is made negative, the operation goes to SA5.

Further, the consecutive travel time $T_M$ involved in the motor drive running mode is a cumulative travel time, related to the motor drive running mode, which is regarded to be cumulative even if the motor drive running mode is intermittently initiated. If the engine output shaft 94 rotates due to the implementation of the engine drive running mode, then, the consecutive travel time $T_M$ is reset to zero. The accumulation of the travel time involved in the motor drive running mode is commenced at a time point when the motor drive running mode is executed in an initial step on a subsequent stage.

In SA5, the operation is executed to determine whether or not the vehicle speed V exceeds the given vehicle speed determining value V1. If this determination is made positive, that is, when the vehicle speed V exceeds the given vehicle speed determining value V1, then, the operation proceeds to SA6. In contrast, if this determination is made negative, then, the control operation in FIG. 9 is terminated. Also, SA3 to SA5 collectively correspond to the executing condition determining means 82.

In SA6 corresponding to rotation initiating means 86, the internal-combustion-engine rotation control is executed to initiate the rotation of the engine output shaft 94. More particularly, in performing the internal-combustion-engine rotation control, the first-motor rotation speed $N_{M1}$ is raised in the same direction as that in which the second-motor rotation speed $N_{M2}$ is raised. This allows the engine rotation speed $N_E$ to be raised to the predetermined target rotation speed $N_{E1}$. Thus, the rotation of the engine output shaft 94 is sustained for the predetermined target rotation time $T_{E1}$ in which no engine ignition is initiated. That is, the engine rotation speed $N_E$ is temporarily raised upon operating the first electric motor M1 with no ignition being initiated in the engine 8. Moreover, as the internal-combustion-engine rotation control is executed, the engine output shaft 94 rotates, causing the consecutive travel distance $L_M$ and the consecutive travel time $T_M$ to be reset to zero.

Figure 10:
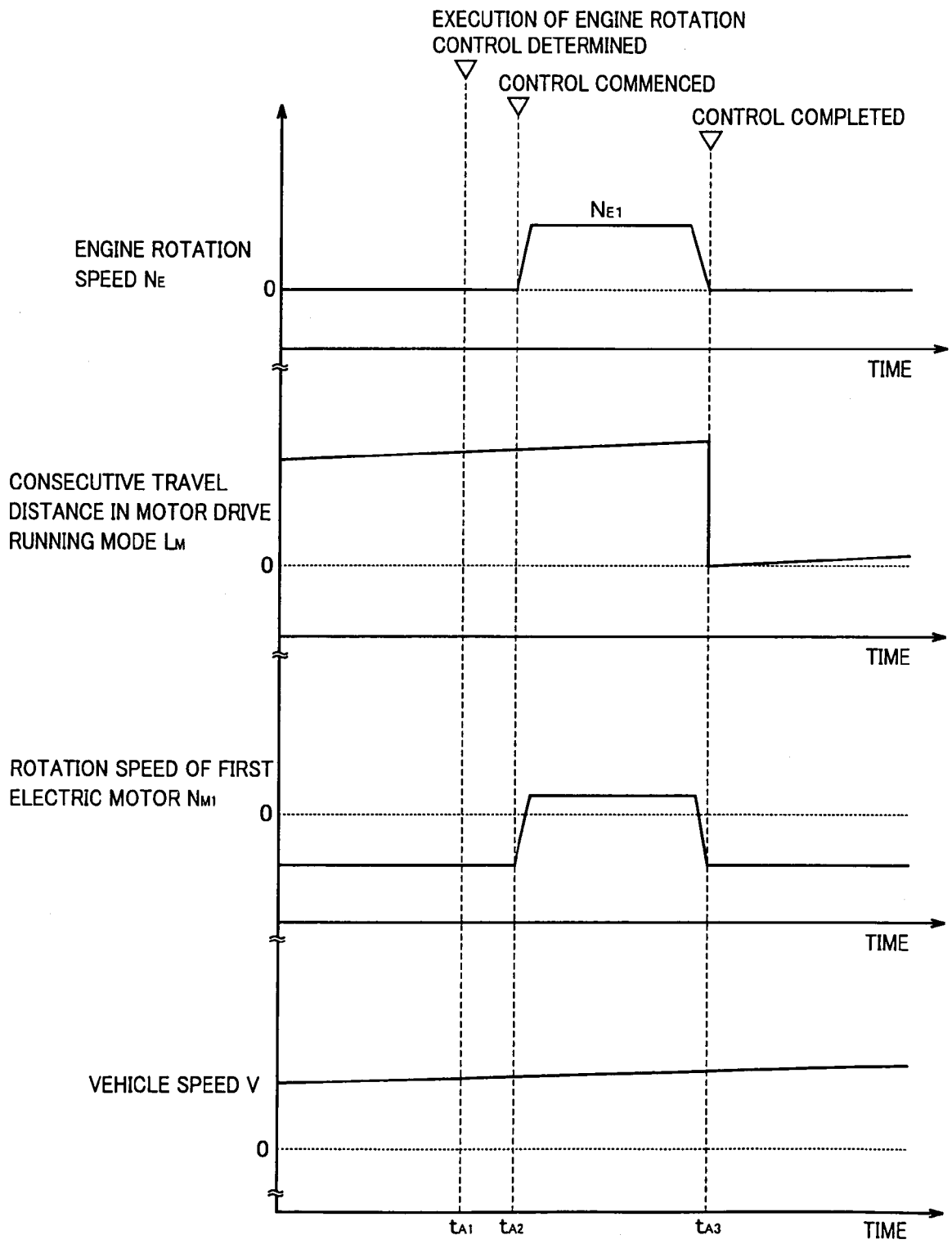
FIG. 10 is a timing chart for illustrating the control operations shown in the flowchart of FIG. 9 wherein an internal-combustion-engine rotation control is executed when a consecutive travel distance involved in the Motor drive running mode exceeds a given consecutive travel distance determining value.

FIG. 10 is a timing chart for illustrating the control operations shown in the flowchart of FIG. 9 and representing a case in which the consecutive travel distance $L_M$ involved in the motor drive running mode exceeds the given consecutive travel distance determining value L1 upon which the internal-combustion-engine rotation control is implemented.

Time instant $t_{41}$ in FIG. 10 indicates the presence of the determination made during the motor drive running mode that the internal-combustion-engine rotation control be executed on the ground of maintaining durability of the engine 8. In particular, the time instant $t_{41}$ indicates the presence of the positive determination made in SA3 that the consecutive travel distance $L_M$ involved in the motor drive running mode exceeds the given consecutive travel distance determining value L1.

Time instant $t_{42}$ in FIG. 10 indicates the commencement of the internal-combustion-engine rotation control. At time instant $t_{42}$, the first-motor rotation speed $N_{M1}$ is raised and the increase in the first-motor rotation speed $N_{M1}$, and the differential action of the power distributing mechanism 16 causes the engine rotation speed $N_E$ to be raised to the target rotation speed $N_{E1}$ in conjunction with the first-motor rotation speed $N_{M1}$.

Time instant $t_{43}$ indicates completion of the internal-combustion-engine rotation control. Accordingly, the turning on of the first electric motor M1 is completed and the first electric motor M1 is brought into a status available to freely rotate. Due to resistance in rotation of the engine 8, the engine rotation speed $N_E$ decelerates from the target rotation speed $N_{E1}$ to be reset to zero at time instant $t_{43}$. In addition, at time instant $t_{43}$, the engine rotation speed $N_E$ is reset to zero. Thus, the first electric motor M1 restores to rotate in a direction opposite to that of the second electric motor M2 due to the differential action effectuated by the second electric motor M2 and the power distributing mechanism 16.

Upon the execution of the internal-combustion-engine rotation control, the engine output shaft 94 is caused to rotate and the consecutive travel distance $L_M$ involved in the motor drive running mode is reset to zero. Though not shown in FIG. 10, the consecutive travel time $T_M$ involved in the motor drive running mode is also reset to zero. In addition, a time interval between time instant $t_{42}$ and time instant $t_{43}$, in which the internal-combustion-engine rotation control is executed, represents the target rotation time $T_{E1}$.

The electronic control device 40 of the present invention has advantageous effects as described below.

(1) Under a circumstance where the consecutive travel distance $L_M$ involved in the motor drive running mode exceeds the given consecutive travel distance determining value L1, the internal-combustion-engine rotation control is executed to cause the engine output shaft 94 to rotate. Then, the rotation of the engine output shaft 94 accelerates the lubrication in the engine 8. In addition, once the engine output shaft 94 rotates, the component parts of the engine 8 do not remain in the completely same attitude in actual practice on a stage before and after the rotation of the engine output shaft 94. Thus, during a period in which the component parts of the engine 8 encounter the running vibrations during the motor drive running mode, no component parts of the engine 8 are kept contact with each other in the same attitude with the engine 8 being halted. This can preclude the running vibrations, occurring during the motor drive running mode, from adversely affecting durability of the engine 8.

(2) The target rotation speed $N_{E1}$, related to the internal-combustion-engine rotation control, is determined to be less than the resonating region in the engine rotation speed region. The parameter, determined in such a way, enables a reduction in the oscillations during the rotation of the engine output shaft 94 that would cause damage to comfort of a vehicle occupant.

(3) Under a situation where the consecutive travel time $T_M$ involved in the motor drive running mode exceeds the given consecutive travel time determining value T1, the internalcombustion-engine rotation control is executed. Then, the rotation of the engine output shaft 94 accelerates the lubrication in the engine 8. In addition, even during a phase in which the engine 8 encounters the running vibrations in the motor drive running mode, no area of the component parts of the halted engine 8 are avoided from being kept contact with each other in the same attitude. This can precludes the running vibrations, occurring during the motor drive running mode, from adversely affecting durability of the engine 8.

(4) In general, as the vehicle speed increases, the oscillations acting on the engine 8 or the like forming the vehicle increase. With the present embodiment, on this point, in a case where the vehicle speed exceeds the given vehicle speed determining value V1, the internal-combustion-engine rotation control is executed. Then, the rotation of the engine output shaft 94 accelerates the lubrication in the engine 8. In addition, during a phase in which the engine 8 encounters the increased running vibrations; the stationary state of the engine 8 is avoided from being continued. This can preclude the running vibrations, occurring during the motor drive running mode, from adversely affecting durability of the engine 8.

(5) In general, as the temperature of lubricating oil for lubricating the engine 8 decreases, the relevant viscosity increases, resulting in a tendency with the occurrence of a difficulty in achieving the lubrication of the engine 8 due to the rotation thereof. With the present embodiment, on this point, the target rotation speed $N_{E1}$, i.e., the rotation speed of the engine output shaft 94 in performing the internal-combustion-engine rotation control, may be altered such that the lower the temperature of coolant liquid for cooling the engine 8, the higher will be the target rotation speed $N_{E1}$. In such a case, in performing the internal-combustion-engine rotation control, the occurrence of degradation in accelerating the lubrication of the engine 8, due to a low temperature of coolant liquid of the engine 8 and a low temperature of lubricating oil of the engine 8, can be suppressed.

(6) With the present embodiment, the target rotation speed $N_{E1}$, i.e., the rotation speed of the engine output shaft 94 in performing the internal-combustion-engine rotation control, may be altered such that the lower the ambient temperature, the higher will be the target rotation speed $N_{E1}$. In such a case, in performing the internal-combustion-engine rotation control, the occurrence of degradation in accelerating the lubrication of the engine 8, due to a low ambient temperature and a low temperature of lubricating oil of the engine 8, can be suppressed.

(7) With the present embodiment, the target rotation time $T_{E1}$, i.e., the implementation time in which the engine output shaft 94 is caused to rotate in performing the internal-combustion-engine rotation control, may be altered such that the lower the temperature of coolant liquid for cooling the engine 8, the longer will be the target rotation time $T_{E1}$. In such a case, in performing the internal-combustion-engine rotation control, the occurrence of degradation in accelerating the lubrication of the engine 8, due to a low temperature of coolant liquid of the engine 8 and a low temperature of lubricating oil of the engine 8, can be suppressed.

(8) With the present embodiment, the target rotation time $T_{E1}$, i.e., the implementation time in which the engine output shaft 94 rotates in performing the internal-combustion-engine rotation control, may be altered such that the lower the ambient temperature, the longer will be the target rotation time $T_{E1}$. In such a case, in performing the internal-combustion-engine rotation control, the occurrence of degradation in accelerating the lubrication of the engine 8, due to a low ambient temperature and a low temperature of lubricating oil of the engine 8, can be suppressed.

(9) The shifting mechanism 10 forming the power transmitting device includes the differential portion 11 in which controlling the operating state of the first electric motor M1 connected to the power distributing mechanism 16 allows the differential state of the power distributing mechanism 16 to be controlled, and the automatic shifting portion 20 forming part of the power transmitting path extending from the engine 8 or the differential portion 11 to the drive wheels 38. This can allow the differential portion 11 and the automatic shifting portion 20 to structure the continuously variable transmission as a whole, enabling output torque of the shifting mechanism 10 to smoothly vary.

(10) The automatic shifting portion 20, being the step-variable transmission, provides a shifting ratio varying in a wide range.

(11) The differential portion 11 includes the first electric motor M1 that functions as a differential-action electric motor of the power distributing mechanism 16, the second electric motor M2 which is the electric motors connected to the power transmitting path leading to the drive wheels 38, i.e., more than two electric motors, and the differential-portion planetary gear set 24. Thus, upon controlling the operating state of the first electric motor M1, the rotation speed $N_{18}$ of the power transmitting member 18, representing the output rotation speed of the differential portion 11, can be caused to continuously increase or decrease even with variation of the engine rotation speed $N_E$.

In the foregoing, the present invention has been described with reference to the embodiment shown in the accompanying drawings. However, the embodiment described is meant to be illustrative only of mere example of the present invention, and the present invention can be implemented in various modifications or improvements in the light of knowledge of those skilled in the art.

For instance, in performing the internal-combustion-engine rotation control of the present embodiment, the engine rotation speed $N_E$ is raised using the first electric motor M1. However, the switching clutch C0 or the switching brake B0 may be brought into full engagements or half-engagements (in slipping states) to restrict the differential action of the power distributing mechanism 16 to thereby cause the rotation of the engine output shaft 94. In other words, this means that the first electric motor M1 is not necessarily needed in rotating the engine output shaft 94. In fact, it may suffice for the shifting mechanism 10 to include the second electric motor M2, i.e., at least one electric motor.

In rotating the engine output shaft 94 with use of the switching clutch C0 or the switching brake B0, the engine output shaft 94 can be rotated with no driving of the first electric motor M1. In performing the internal-combustion-engine rotation control, the drive wheels 38 deliver the reverse drive torque to the engine 8 during the vehicle running. If such reverse drive torque lies at an adequately high level needed for initiating the rotation of the engine output shaft 94, the second electric motor M2 may have no need to provide output torque. In addition, the switching clutch C0 or the switching brake B0 are engaging elements that can limit the differential action of the power distributing mechanism 16 forming the differential mechanism. Thus, these component elements can be said to be a differential-action limiting device of the power distributing mechanism 16.

In the illustrated embodiment, the shifting mechanism 10 includes the power distributing mechanism 16, serving as the differential mechanism, and the first electric motor M1. However, it may suffice to include a hybrid vehicle having none of the first electric motor M1 and the power distributing mechanism 16, in which the engine 8, the clutch, the second electric motor M2 serving as the electric motor connected to the power transmitting path leading to the drive wheels 38, and the automatic shifting portion 20, are connected in series. In performing the internal-combustion-engine rotation control with such an arrangement, for instance, permitting the clutches intervening between the engine 8 and the second electric motor M2 to be brought into full engagements or half-engagements (in slipping states) enables the reverse drive transferred from the drive wheels 38 and the second-motor torque $T_{M2}$ to rotate the engine output shaft 94.

The shifting mechanism of the present embodiment takes the form of a structure including at least a mechanical path (mechanical power transmitting path) in which mechanical energy output from the engine 8 is not converted to electrical energy and transferred to the drive wheels 38. However, the present invention may also be applied to a hybrid vehicle of the so-called series hybrid type. The hybrid of this type takes the form of a structure in which the engine 8 is not mechanically connected to the drive wheels 38 and which includes two electric motors, having a generator (electric power generating) function and a motor (electric motor), which are electrically connected to each other. Of these electric motors, one electric motor is mechanically connected to the engine 8 and other electric motor is disposed on the power transmitting path to the drive wheel 38. One electric motor converts mechanical energy output from the engine 8 to electric energy which is converted with the other electric motor to mechanical energy to cause the vehicle to run.

Under a circumstance where the vehicle speed V exceeds the given vehicle speed determining value V1 during the motor drive running mode, the internal-combustion-engine rotation control is executed. If there occurs a status with the vehicle speed V continuously exceeding the given vehicle speed determining value V1 during the motor drive running mode, the internal-combustion-engine rotation control may be executed for intermittent intervals each in a given time interval without continuously rotating the engine output shaft 94 in the internal-combustion-engine rotation control. Further, in a case where the vehicle speed V continuously exceeds the given vehicle speed determining value V1 for a given time interval during the motor drive running mode, the running state may be switched from the motor drive running mode to the engine drive running mode.

As the internal-combustion-engine rotation control is executed, the rotation of the engine output shaft 94 continues for the target rotation time $T_{E1}$. However, the rotation of the engine output shaft 94 has no need to be limited in terms of time, and it may be sufficiently initiated to achieve for instance a given number of revolutions. Stated another way, the engine output shaft 94 may be caused to rotate in one revolution.

The coolant for the engine 8 is not limited in the component thereof, but may be the water or the oil as long as it is the liquid capable of cooling the engine 8. The differential portion 11 (power distributing mechanism 16) functions as the electrically operated continuously variable transmission in which the gear ratio γ0 is continuously changed from the minimum ratio $γ0_{min}$ to the maximum ratio $γ0_{max}$. However, the shifting ratio γ0 of the differential portion 11 can be changed stepwise, not continuously, using the differential function.

In the above shifting mechanism 10, the engine 8 and the differential portion 11 are connected directly, but the engine 8 may be connected to the differential portion 11 via engaging element such as the clutch and the like.

In the above shifting mechanism 10, the first electric motor M1 and the second rotary element RE2 are connected directly, and the second electric motor M2 and the third rotary element RE3 are connected directly. However, the first electric motor M1 may be connected to the second rotary element RE2 via engaging element such as the clutch and the like, and the second electric motor M2 may be connected to third rotary element RE3 via engaging element such as the clutch and the like.

On the power transmitting path extended from the engine 8 to the drive wheel 38, the automatic shifting portion 20 is disposed next to the differential portion 11, but the differential portion 11 may be disposed next to the automatic shifting portion 20. In summary, the automatic shifting portion 20 is sufficiently disposed to form the part of the power transmitting path from the engine 8 to the drive wheel 38.

In the structure show in FIG. 1, the differential portion 11 and the automatic shifting portion 20 are connected directly. However, the present invention can be applied to the structure as long as the shifting mechanism 10 has an electrical differential function capable of changing the shifting state thereof electrically as a whole, and a function for performing the shifting in the principle different from the electrical differential function. Under such situation, mechanical independence between the differential portion 11 and the automatic shifting portion 20 is not required.

The power distributing mechanism 16 comprised of the single planetary gear unit in the present embodiment, may be comprised of a double planetary gear unit.

In the differential-portion planetary gear unit 24, the engine 8 is connected to the first rotary element RE1 in the power transmissive state, the first electric motor M1 is connected to the second rotary element RE2 in the power transmissive state, and the power transmitting path extended to the drive wheel 38 is connected to the third rotary element RE3. However, when two planetary gear units are connected with each other by a part of the rotary elements forming them, the present invention can be applied to a structure in which with the engine, the electric motor and the drive wheel being respectively connected to the rotary elements of respective planetary gear units in the power transmissive state, the clutch or brake connected to the rotary element of the planetary gear unit is controlled to change the structure to the step-variable state or the continuously variable state.

The shifting portion which is comprised of the automatic shifting portion 20 formed of the step-variable automatic transmission in the present embodiment, may be a continuous CVT or a shifting portion functioning as a manually operated transmission.

In the present embodiment, the second electric motor M2 is connected to the transmitting member 18 directly. However, connecting manner is not limited to such manner. That is, the second electric motor M2 may be connected to the power transmitting path extended from the engine 8 or the transmitting member 18 to the drive wheel 38 directly, or may be connected thereto indirectly via the transmission, the planetary gear unit, the engaging unit and the like.

In the above power distributing mechanism 16, the differential-portion carrier CA0 is connected to the engine 8, the differential-portion sun gear S0 is connected to the first electric motor M1, and the differential-portion ring gear R0 is connected to the transmitting member 18. However, connecting relation of them is not limited to this relation. That is, the engine 8, the first electric motor M1 and the transmitting member 18 may be connected any of three elements CA0, S0 or R0 of the differential-portion planetary gear unit 24.

The engine 8 directly connected to the input shaft 14 in the present embodiment, may be connected operatively connected via a gear, belt and the like. The engine 8 is not required to be disposed coaxially with the input shaft 14.

In the present embodiment, the first electric motor M1 and the second electric motor M2 are coaxially disposed on the input shaft 14 such that the former is connected to the differential-portion sun gear S0 and the latter is connected to the transmitting member 18. However, such disposal and connecting manners are not essential. That is, the first electric motor M1 and the second electric motor M2 are operatively connected to the differential-portion sun gear S0 and the transmitting member 18 respectively, via the gear, belt, speed reducer and the like.

In the present embodiment, the automatic transmission portion 20 is serially connected to the differential portion 11 via the transmitting member 18. However, with disposing a counter shaft parallel to the input shaft 14, the automatic transmission portion 20 may be disposed on the counter shaft coaxially therewith. In this case, the differential portion 11 and the automatic transmission portion 20 are connected to each other in the power transmissive state via the transmitting member 18 such as a paired counter gears, or a set of transmitting member including sprockets and a chain.

In the present embodiment, the power distributing mechanism 16 is comprised of the paired differential-portion planetary gear unit 24. However, it may be comprised of three or more planetary gear units which function as the transmission having three or more gear positions in the non-differential state (fixed speed state).

The second electric motor M2 is connected to the power transmitting path extended from the engine 8 to the drive wheel 38. Thus, the second electric motor M2 is, in addition to the connection to the power transmitting path, connected to the power distributing mechanism 16 via the engaging element such as the clutch etc. Accordingly, the shifting mechanism 10 can have the structure in which instead the first electric motor M1, the second electric motor M2 is used to control the differential state of the power distributing mechanism 16.

What is claimed is:

1. A control device for a hybrid vehicle drive apparatus comprising:
    an internal combustion engine;
    an electric motor connected to a power transmitting path extending to drive wheels;
    an electrically controlled differential portion including a differential mechanism connected to the internal combustion engine in power transmissive manner and a differential-action electric motor connected to the differential mechanism in power transmissive manner, which is operative to control a differential state of the differential mechanism upon controlling an operating state of the differential-action electric motor, and a differential-action limiting device limiting a differential action of the differential mechanism;
    a motor drive running mode configured to cause a vehicle to run with the electric motor with the internal combustion engine remaining under a halted state, wherein
        the control device is operative to perform an internal-combustion-engine rotation control for rotating an output shaft of the internal combustion engine under a circumstance where a consecutive travel distance involved in the motor drive running mode exceeds a given consecutive travel distance determining value;
        the control device is operative to perform the internal-combustion-engine rotation control also under a circumstance where a vehicle speed involved in the motor drive running mode exceeds a given vehicle speed determining value;
        the control device is operative to continue the motor drive running mode without performing the internal-combustion-engine rotation control under a circumstance where the consecutive travel distance involved in the motor drive running mode does not exceed the given consecutive travel distance determining value and the vehicle speed involved in the motor drive running mode does not exceed the given vehicle speed determining value; and
        the control device causes the output shaft of the internal combustion engine to rotate upon limiting the differential action of the differential mechanism.

2. The control device for the hybrid vehicle drive apparatus according to claim 1, wherein a rotation speed of the output shaft is altered in the internal-combustion-engine rotation control depending on a temperature of a coolant liquid of the internal combustion engine.

3. The control device for the hybrid vehicle drive apparatus according to claim 1, wherein a rotation speed of the output shaft is altered in the internal-combustion-engine rotation control depending on an ambient temperature.

4. The control device for the hybrid vehicle drive apparatus according claim 1, wherein an implementation time for rotating the output shaft is altered in the internal combustion engine depending on a temperature of a coolant liquid of the internal combustion engine.

5. The control device for the hybrid vehicle drive apparatus according to claim 1, wherein an implementation time for rotating the output shaft is altered in the internal-combustion-engine rotation control depending on an ambient temperature.

6. The control device for the hybrid vehicle drive apparatus according to claim 1, wherein
    the hybrid vehicle drive apparatus further comprises a shifting portion forming part of the power transmitting path.

7. The control device for the hybrid vehicle drive apparatus according to claim 6, wherein the shifting portion is a step-variable transmission.

8. The control device for the hybrid vehicle drive apparatus according to claim 6, wherein the electrically controlled differential portion is more than two electric motors and a planetary gear set.

9. The control device for the hybrid vehicle drive apparatus according to claim 1, wherein the control device includes running state determining device, executing condition determining device and rotation initiating device.

10. A control device for a hybrid vehicle drive apparatus comprising:
    an internal combustion engine;
    an electric motor connected to a power transmitting path extending to drive wheels;
    an electrically controlled differential portion including a differential mechanism connected to the internal combustion engine in power transmissive manner and a differential-action electric motor connected to the differential mechanism in power transmissive manner, which is operative to control a differential state of the differential mechanism upon controlling an operating state of the differential-action electric motor, and a differential-action limiting device limiting a differential action of the differential mechanism;

a motor drive running mode configured to cause a vehicle to run with the electric motor with the internal combustion engine remaining under a halted state, wherein the control device is operative to perform an internal-combustion-engine rotation control for rotating an output shaft of the internal combustion engine under a circumstance where a consecutive travel time involved in the motor drive running mode exceeds a given value; and the control device causes the output shaft of the internal combustion engine to rotate upon limiting the differential action of the differential mechanism.

11. The control device for the hybrid vehicle drive apparatus according to claim 10, wherein a rotation speed of the output shaft is altered in the internal-combustion-engine rotation control depending on a temperature of a coolant liquid of the internal combustion engine.

12. The control device for the hybrid vehicle drive apparatus according to claim 10, wherein a rotation speed of the output shaft is altered in the internal-combustion-engine rotation control depending on an ambient temperature.

13. The control device for the hybrid vehicle drive apparatus according to claim 10, wherein an implementation time for rotating the output shaft is altered in the internal combustion engine depending on a temperature of a coolant liquid of the internal combustion engine.

14. The control device for the hybrid vehicle drive apparatus according to claim 10, wherein an implementation time for rotating the output shaft is altered in the internal-combustion-engine rotation control depending on an ambient temperature.

15. The control device for the hybrid vehicle drive apparatus according to claim 10, wherein the hybrid vehicle drive apparatus further comprises a shifting portion forming part of the power transmitting path.

16. The control device for the hybrid vehicle drive apparatus according to claim 15, wherein the shifting portion is a step-variable transmission.

17. The control device for the hybrid vehicle drive apparatus according to claim 15, wherein the electrically controlled differential portion is more than two electric motors and a planetary gear set.

18. The control device for the hybrid vehicle drive apparatus according to claim 10, wherein the control device includes running state determining device, executing condition determining device and rotation initiating device.

19. The control device for the hybrid vehicle drive apparatus according to claim 18 wherein (a) the running state determining device determines whether or not the electric motor performs the motor drive running mode to cause the vehicle to run under a halt state of the internal-combustion engine; (b) the executing condition determining device determines whether or not at least one of (i) consecutive travel distance $L_M$ involved in the motor drive running mode exceeds a given consecutive travel distance determining value L1, (ii) a consecutive travel time $T_M$ involved in the motor drive running mode exceeds a given consecutive travel time determining value T1, and (iii) a vehicle speed V1 exceeds a given vehicle speed determining value V1; and (c) the rotation initiating device performs an internal-combustion-engine rotation control for rotating the output shaft.

20. A control device for a hybrid vehicle drive apparatus comprising:

an internal combustion engine;

an electric motor connected to a power transmitting path extending to drive wheels;

an electrically controlled differential portion including a differential mechanism connected to the internal combustion engine in power transmissive manner and a differential-action electric motor connected to the differential mechanism in power transmissive manner, which is operative to control a differential state of the differential mechanism upon controlling an operating state of the differential-action electric motor, and a differential-action limiting device limiting a differential action of the differential mechanism;

a motor drive running mode configured to cause a vehicle to run with the electric motor with the internal combustion engine remaining under a halted state, wherein the control device is operative to perform an internal-combustion-engine rotation control for rotating an output shaft of the internal combustion engine under a circumstance where a vehicle speed involved in the motor drive running mode exceeds a given value; and the control device causes the output shaft of the internal combustion engine to rotate upon limiting the differential action of the differential mechanism.

21. The control device for the hybrid vehicle drive apparatus according to claim 20, wherein a rotation speed of the output shaft is altered in the internal-combustion-engine rotation control depending on a temperature of a coolant liquid of the internal combustion engine.

22. The control device for the hybrid-vehicle drive apparatus according to claim 20, wherein a rotation speed of the output shaft is altered in the internal-combustion-engine rotation control depending on an ambient temperature.

23. The control device for the hybrid vehicle drive apparatus according to claim 20, wherein an implementation time for rotating the output shaft is altered in the internal combustion engine depending on a temperature of a coolant liquid of the internal combustion engine.

24. The control device for the hybrid vehicle drive apparatus according to claim 20, wherein an implementation time for rotating the output shaft is altered in the internal-combustion-engine rotation control depending on an ambient temperature.

25. The control device for the hybrid vehicle drive apparatus according to claim 20, wherein the hybrid vehicle drive apparatus further comprises a shifting portion forming part of the power transmitting path.

26. The control device for the hybrid vehicle drive apparatus according to claim 25, wherein the shifting portion is a step-variable transmission.

27. The control device for the hybrid vehicle drive apparatus according to claim 25, wherein the electrically controlled differential portion is more than two electric motors and a planetary gear set.

28. The control device for the hybrid vehicle drive apparatus according to claim 20, wherein the control device includes running state determining device, executing condition determining device and rotation initiating device.

29. The control device for the hybrid vehicle drive apparatus according to claim 28 wherein (a) the running state determining device determines whether or not the electric motor performs the motor drive running mode to cause the vehicle to run under a halt state of the internal-combustion engine; (b) the executing condition determining device determines whether or not at least one of (i) consecutive travel distance $L_M$ involved in the motor drive running mode exceeds a given consecutive travel distance determining value L1, (ii) a consecutive travel time $T_M$ involved in the motor drive running mode exceeds a given consecutive travel time determining value T1, and (iii) a vehicle speed V1 exceeds a given vehicle speed determining value V1; and (c) the rotation initiating device performs an internal-combustion-engine rotation control for rotating the output shaft.

\* \* \* \* \*